United States Patent [19]

Powers et al.

[11] Patent Number: 5,071,913

[45] Date of Patent: Dec. 10, 1991

[54] RUBBERY ISOOLEFIN POLYMERS EXHIBITING IMPROVED PROCESSABILITY

[75] Inventors: Kenneth W. Powers, Berkeley Heights; Hsien-Chang Wang, Edison; Debra C. Handy, Basking Ridge; James V. Fusco, Red Bank, all of N.J.

[73] Assignee: Exxon Chemical Patents Inc., Linden, N.J.

[21] Appl. No.: 131,938

[22] Filed: Dec. 11, 1987

[51] Int. Cl.$^5$ .......................... C08L 9/06; C08L 47/00; C08L 51/04; C08L 23/22

[52] U.S. Cl. ........................................ 525/87; 525/86; 525/98; 525/99; 525/191; 525/192; 525/193; 525/313; 525/314; 525/315; 525/319; 525/332.3; 525/333.4; 525/918; 526/339; 526/348.7; 152/525

[58] Field of Search ............ 526/335, 339, 340, 348.7; 525/98, 99, 86, 87, 193, 332.3, 191, 192, 314, 315, 313, 319, 333.4

[56] References Cited

U.S. PATENT DOCUMENTS

| | | | |
|---|---|---|---|
| 1,443,149 | 1/1923 | Schidrowitz | 525/332.5 |
| 1,682,857 | 9/1928 | Schidrowitz | 525/332.5 |
| 3,265,765 | 8/1966 | Holden et al. | 525/99 X |
| 3,476,831 | 11/1969 | Daumiller et al. | 260/879 |
| 3,904,708 | 9/1975 | Kennedy et al. | 260/878 R |
| 3,933,942 | 1/1976 | Kennedy et al. | 260/878 R |
| 4,252,710 | 2/1981 | Powers et al. | 260/33.8 UA |
| 4,342,670 | 8/1982 | Ahagon et al. | 525/143 X |
| 4,358,560 | 11/1982 | Powers et al. | 524/468 |
| 4,474,924 | 10/1984 | Powers et al. | 524/468 |
| 4,624,296 | 11/1986 | Takiguchi | 525/236 X |

FOREIGN PATENT DOCUMENTS 799043 7/1958 United Kingdom ............. 525/331.9

OTHER PUBLICATIONS

W. G. Wren, The Chemistry of Natural Rubber Production, Chemistry of Natural Rubber, pp. 378-412, 1960.

L. M. White et al., Industrial and Engineering Chemistry, Aug. 1948, "Gel as a Definitive Property in GR-S Technology", vol. 37, No. 8, pp. 770-775.

R. A. Crawford, G. J. Tiger, Industrial and Engineering Chemistry, vol. 41, No. 3, "Improved-Processing GR-S by Variations in Compounding", Mar. 1949, pp. 592-596.

D. L. Schoene et al., Industrial and Engineering Chemistry, "Development of a Better Processing GR-S", Dec. 1946, vol. 38, No. 12, pp. 1246-1249.

*Primary Examiner*—Fred Teskin
*Attorney, Agent, or Firm*—H. L. Cohen

[57] ABSTRACT

A substantially gel free $C_4$ to $C_7$ isoolefin homopolymer rubber, butyl copolymer rubber, halogenated butyl rubber (e.g., chlorinated or brominated), or mixtures thereof, comprising a molecular weight distribution such that the ratio of the moments of said molecular weight distribution, $M_z/M_w$, is equal to or exceeds 2.0, and that portion of said molecular weight distribution which is equal to and greater than 4 times the peak molecular weight, $M_p$, comprises greater than 8 percent of the total polymer species, and $M_p$ is greater than about 250,000 and wherein said polymer species of molecular weight less than $M_p$ are substantially branch free. Various means are disclosed for effecting the molecular weight distribution including blending of homopolymers and/or copolymers of appropriate molecular weight and molecular weight distribution and direct polymerization using a functional reagent to introduce branching. The rubber compositions are particularly useful in applications in which butyl or halogenated butyl rubber is used and where it is desired to obtain high green strength in combination with an increased rate of stress relaxation. Such polymers are particularly well suited for use in tire innerliner compositions.

27 Claims, 6 Drawing Sheets

RUBBERY ISOOLEFIN POLYMERS EXHIBITING IMPROVED PROCESSABILITY

BACKGROUND OF THE INVENTION

This invention relates to a method of improving the processing properties of isoolefinic homopolymers and copolymers, especially those commonly known as butyl rubber or isobutylene-isoprene copolymer rubber. The invention also relates to methods for producing such improved processing polymers and the specific molecular criteria which must be controlled in order to obtain these improved properties. The invention particularly relates to the achievement of improved processing properties by means of controlled and specific modification of the molecular weight distribution of these polymers. The term "butyl rubber" as used in the specification and claims means copolymers of $C_4$ to $C_7$ isoolefins and $C_4$ to $C_{14}$ conjugated dienes which comprise about 0.5 to about 15 mole percent conjugated diene and about 85 to 99.5 mole percent isoolefin. Illustrative examples of the isoolefins which may be used in the preparation of butyl rubber are isobutylene, 2-methyl-1-propene, 3-methyl-1-butene, 4-methyl-1-pentene and beta-pinene. Illustrative examples of conjugated dienes which may be used in the preparation of butyl rubber are isoprene, butadiene, 2,3-dimethyl butadiene, piperylene, 2,5-dimethylhexa-2,4-diene, cyclopentadiene, cyclohexadiene and methylcyclopentadiene. The preparation of butyl rubber is described in U.S. Pat. application No. 2,356,128 and is further described in an article by R. M. Thomas et al. in Ind. & Eng. Chem., vol. 32, pp. 1283 et seq., Oct., 1940. Butyl rubber generally has a viscosity average molecular weight between about 100,000 to about 1,500,000, preferably about 250,000 to about 800,000 and a Wijs Iodine No. (INOPO) of about 0.5 to 50, preferably 1 to 20 (for a description of the INOPO test, see Industrial and Engineering Chemistry, Vol. 17, p. 367, 1945).

The term isoolefin homopolymers as used herein is meant to encompass those homopolymers of $C_4$ to $C_7$ isoolefins particularly polyisobutylene, which have a small degree of terminal unsaturation and certain elastomeric properties. The principal commercial forms of these butyl rubber and isoolefin polymers such as isobutylene isoprene butyl rubber and polyisobutylene, are prepared in a low temperature cationic polymerization process using Lewis acid type catalysts, typically aluminum chloride being employed. Ethyl aluminum dichloride and boron trifluoride are also considered useful in these processes. The process extensively used in industry employs methyl chloride as the diluent for the reaction mixture at very low temperatures, that is less than minus 90° C. Methyl chloride is typically employed for a variety of reasons, including the fact that it is a solvent for the monomers and aluminum chloride catalyst and a nonsolvent for the polymer product thereby resulting in a slurry. Also, methyl chloride has suitable freezing and boiling points to permit, respectively, low temperature polymerization and effective separation from the polymer and unreacted monomers. However, it is also possible to conduct such polymerizations in a diluent which is a solvent for the polymer produced, e.g., pentane, hexane and heptane and mixtures of such solvents with one another or with methyl chloride and/or methylene chloride. As will be described later, there are some advantages which can be obtained by conducting the polymerization in solution under certain conditions relating to the particular monomers and other reactants employed in the polymerization.

The slurry polymerization process in methyl chloride offers a number of additional advantages in that a polymer concentration of approximately 30% by weight in the reaction mixture can be achieved, as opposed to the concentration of only about 8% to 12% in solution polymerization. Also, an acceptable, relatively low viscosity of the polymerization mass is obtained enabling the heat of polymerization to be removed more effectively by heat exchange. Slurry polymerization processes in methyl chloride are used in the production of high molecular weight polyisobutylene and isobutylene-isoprene butyl rubber polymers.

U.S. Pat. Nos. 4,252,710, 4,358,560 and 4,474,924, each incorporated herein by reference, disclose methods for stabilizing against agglomeration the slurry polymerization product of the isoolefin homopolymers or butyl rubber copolymers polymerized in a polar chlorinated hydrocarbon diluent such as methyl chloride, methylene chloride, vinyl chloride or ethyl chloride. The significant advance of slurry stabilization disclosed in those patents is achieved by the use of a stabilizing agent being (i) a preformed copolymer having a lyophilic, polymerization diluent soluble portion and a lyophobic polymerization diluent insoluble portion, the lyophobic portion being soluble in or adsorbable by the product polymer and the stabilizing agent being capable of forming an adsorbed solubilized polymer coating around the precipitated isoolefin homopolymer or butyl copolymer to stabilize the slurry, or (ii) an in situ formed stabilizing agent copolymer formed from a stabilizer precursor, the stabilizer precursor being a lyophilic polymer containing a functional group capable of copolymerizing or forming a chemical bond with the product polymer, the functional group being cationically active halogen or cationically active unsaturation, the lyophobic portion of the stabilizing agent being product polymer, the stabilizing agent so formed being capable of forming an adsorbed solubilized polymer coating around the precipitated product polymer to stabilize the product polymer slurry.

Various classes and specific types of useful stabilizing agents are disclosed and exemplified, some of which produce substantially gel free polymers and others of which produce gelled polymers under various polymerization conditions. Some of the stabilizing agents disclosed may be useful herein under appropriate, defined conditions, but the criteria for distinguishing between those which can be used herein and those which cannot be used were not known or disclosed in those patents. In addition, in order to produce the desired polymer with improved properties as disclosed in the invention herein, the agents must be used in effective concentration in order to produce controlled amounts of defined molecular weight components in the rubber; such critical limitations were unknown in the prior art and were neither suggested nor exemplified. Furthermore, alternative means for producing the unique, improved processing polymers of this invention are available as will be further disclosed herein.

In the processing of the rubbers of commerce, it is preferred that they possess sufficient green (uncured) strength to resist excessive flow and deformation in the various handling operations. It is generally believed that green strength is related to molecular weight with green strength improving as molecular weight increases. However, it is also desirable that in certain applications such rubbers have a rapid stress relaxation rate so that the stresses imposed during forming operations relax quickly and the rubber does not slowly change its shape or pull apart due to these undissipated forming stresses. Unfortunately, stress relaxation rate is also a function of molecular weight with the relaxation rate becoming slower as molecular weight increases. Hence, as molecular weight is increased to improve green strength, stress relaxation rate is reduced. Thus, as the rubber becomes better able to resist flow and deformation in the various handling operations it becomes more prone to change shape or pull apart due to unrelaxed forming stresses and a compromise becomes necessary in which green strength is sacrificed in order to achieve sufficiently rapid stress relaxation in the particular end use application. Furthermore, increasing molecular weight in order to increase green strength can make it more difficult to process the polymer and to disperse fillers and additives.

It would be desirable to be able to alter the balance between green strength and stress relaxation rate to achieve higher green strength without sacrificing relaxation rate or faster relaxation rate without sacrificing green strength.

It has previously been disclosed that some processing properties of natural rubber can be improved by the addition of prevalcanized natural rubber latex into natural rubber (see, e.g., U.S. Pat. Nos. 1,443,149 and 1,682,857); such a product was commercialized in the early 1960's (see, e.g., W. G. Wren, Rubber Chemistry & Technology, 34,378,403 [1961]). Similarly, the addition of a gel fraction for achieving processing advantages in styrene-butadiene rubber (SBR) has also been reported (see, e.g., L. M. White, Ind. & Eng. Chem., 37, 770 [1945]); Crawford and Tiger, Ind. & Eng. Chem., 41,592 (1949). Other disclosures have also been made relating to the use of SBR crosslinked with divinyl benzene (D. L. Schoene, Ind. & Eng. Chem., 38,1246 [1946]) and blends of crosslinked latex with uncrosslinked latex (O. W. Burke, Jr., British Patent 799,043). In each of these early developments, the benefit disclosed was achieved by use of a crosslinked rubber fraction. The means of producing a controlled change in molecular weight distribution and the specific nature of the change required were not understood or disclosed, nor was the specific application of such knowledge to isoolefin homopolymers and butyl rubber polymers.

As noted above, the use of divinyl benzene to effect crosslinking in a rubber has been described. Other references have similarly disclosed the use of divinyl benzene (DVB) in a butyl polymerization process to obtain a modified product with increased resistance to cold flow (U.S. Pat. No. 2,781,334); the product is alternatively described as soluble in organic solvents and having a relatively low gel content. U.S. Pat. No. 3,135,721 is directed to a particular process which uses DVB for reducing fouling during start-up of the polymerization process and does not disclose properties for any product or distinguish between those products containing very low levels of DVB and those at higher concentrations. Other references disclose the use of DVB at even higher concentrations to produce polymers containing large amounts of gel and so are not particularly relevant to the invention herein (U.S. Pat. Nos. 2,671,774; 2,729,626; 3,548,080). Finally, a polymerization process patent (U.S. Pat. No. 3,219,641) discloses the use of DVB and high boiling equivalents in the range of 0.01 to 10 weight percent based on total polymer to clean a recycle monomer stream before drying.

Still other references disclose methods and products in which cationically polymerizable monomers such as isobutylene are grafted to halogenated polymers with reactive halogen such as chlorinated butyl rubber, polyvinylchloride, etc. (U.S. Pat. Nos. 3,476,831; 3,904,708; and 3,933,942). The objective of these references is to produce a copolymer in which a monomer such as isobutylene (or isobutylene/isoprene) is grafted onto a diene polymer backbone which may include styrene. However, the references are not directed to the butyl rubber process, the grafted materials are not essentially butyl polymers as described herein and the method of obtaining butyl polymers with the improved characteristics disclosed herein is not disclosed or suggested. Furthermore, the references are particularly limited with respect to the nature of the catalyst which can accomplish the grafting process, and ethyl aluminum dichloride, a useful catalyst herein, is described as particularly unsuitable for the purposes of these references (see, e.g., U.S. No. 3,904,708, Example 16).

SUMMARY OF THE INVENTION

A composition of matter comprising $C_4$ to $C_7$ isoolefin homopolymer rubber, butyl copolymer rubber, halogenated butyl copolymer rubber or mixtures thereof, wherein the molecular weight distribution of the rubber or the mixture is such that the ratio of the moments of the molecular weight distribution, $M_z/M_w$, is equal to or exceeds 2.0 and that portion of the molecular weight distribution which is equal to and greater than 4 times the peak molecular weight, $M_p$, comprises greater than 8 percent of the total polymer species and $M_p$ is greater than about 250,000 and wherein said polymer species of molecular weight less than $M_p$ are substantially branch free. The desired molecular weight distribution is achieved by blending of homopolymers and/or copolymers of appropriate molecular weight and molecular weight distribution and by direct polymerization using a functional reagent to introduce branching. The rubbers are substantially gel free and have improved green strength and stress relaxation rate which properties are particularly advantageous in applications in which butyl or halogenated butyl rubber is used and where it is desired to obtain high green strength in combination with an increased rate of stress relaxation. Such polymers are particularly well suited for use in tire innerliner and innertube compositions.

DETAILED DESCRIPTION OF THE INVENTION

Figure 1:
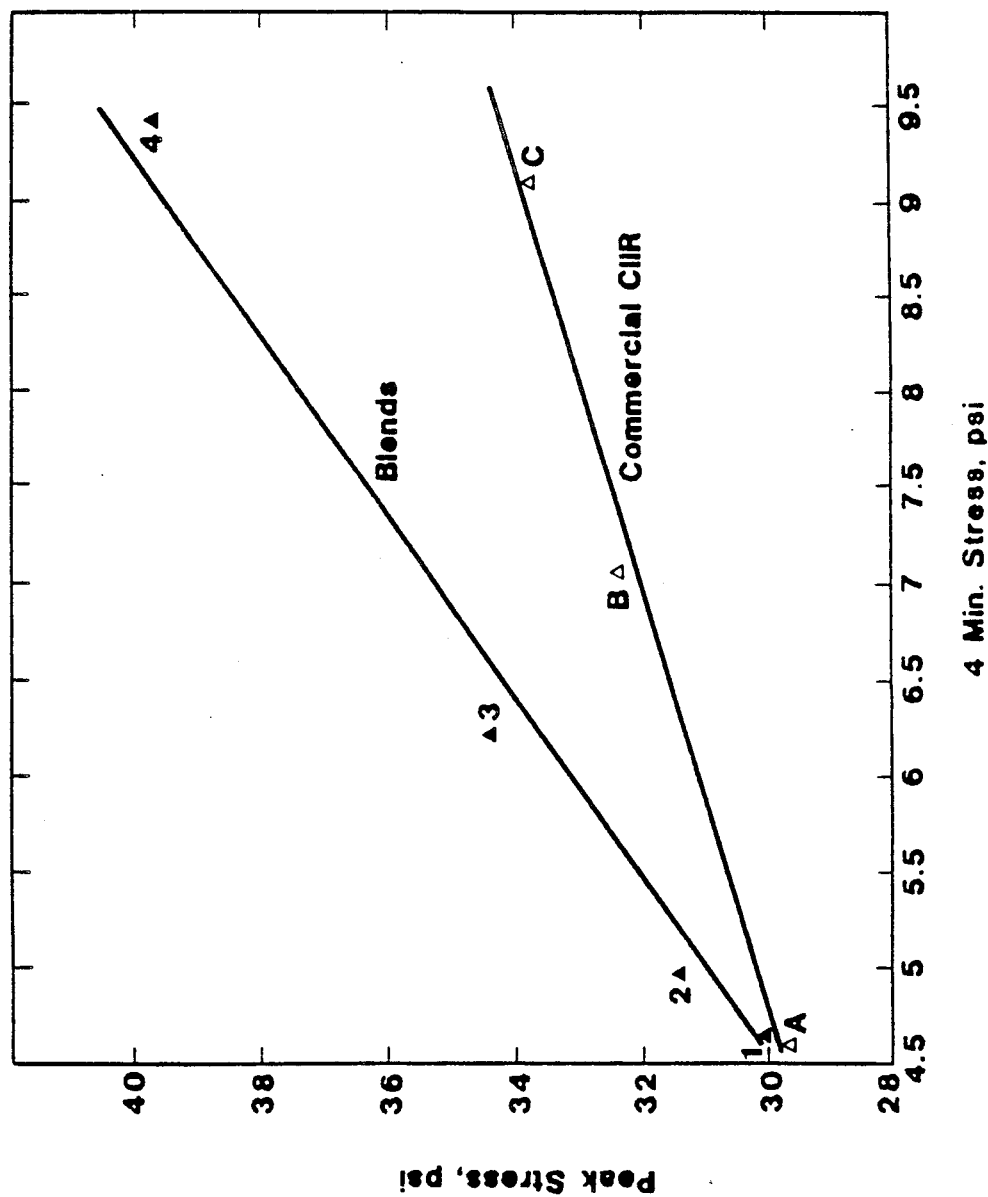

Polymerization of isoolefin homopolymer or butyl rubber copolymers, e.g., polyisobutylene and isobutylene-isoprene butyl rubber, are well known in the art, as noted above. Various grades of these polymers have been commercially available for many years, such products differing in molecular weight and unsaturation (in the case of the isoprene-containing copolymer).

Processes used to produce these polymers include solution polymerization utilizing diluents such as aliphatic hydrocarbons, such as pentane, hexane and heptane. Since polymerization is typically conducted at low temperatures, generally less than about $-20°$ C., typically less than about $-70°$ C., preferably less than about $-90°$ C., the diluent must be selected with the operating temperature in mind in order to avoid freezing. Alternative processes utilize the slurry polymerization method wherein the diluent is initially a solvent for the monomers and catalyst; upon polymerization the polymer forms a slurry in the diluent. Useful diluents for this purpose include methyl chloride, methylene chloride, vinyl chloride and ethyl chloride, with methyl chloride being preferred. Mixtures of diluents are also useful, including mixtures of solvent-type and slurry-type, for example hexane and methyl chloride.

Various techniques are available for modifying the molecular weight and/or molecular weight distribution of polyisoolefins such as polyisobutylene and butyl rubber such as isobutylene-isoprene rubber. The invention herein is directed to achieving improvements in the properties of green strength and stress relaxation of the polymer and compositions in which it is used (e.g., inner tubes and tire innerliners); improvements in tack can also be obtained. The desired improvements are achieved by modifying the molecular weight distribution in a specific manner and controlling the type and extent of branching in the polymer as will be described in detail.

For the purposes of this disclosure properties have been determined as follows:

I. Green strength/stress relaxation

A Sample preparation. Samples can be tested in the neat form (polymer only, typically stabilized against oxidation) or in a compounded form containing specific amounts and types of filler (e.g., carbon black), extender (e.g., rubber process oil), etc. For the test to be run in tension, tensile pads (6 in.×6 in.×0.080 in. thickness) are pressed between sheets of Mylar film at a pressure of 500 psi (12.4 MPa), applied gradually over a period of 1.5 min. and molded at a temperature of 150° C. for 20 minutes. The mold is transferred to a water cooled press and cooled under pressure for 20 minutes. The molded pads are removed from the Mylar and placed between polyethylene sheets. Test specimens are cut 0.5 in. wide×6 in. long; thickness is accurately measured.

B. Testing. Using a tensile testing machine such as an Instron ® tester, a sample is extended to 100% elongation at 20 inches/minute; green strength is defined as the peak stress at 100% elongation. The sample is held at 100% extension and allowed to relax for 4 minutes; the relaxed stress at 4 minutes is recorded. Stress values are expressed in psi using the initial sample cross-sectional area.

C. Stress Relaxation Processability Tester (SRPT). The SRPT test is an alternate means of evaluating green strength/stress relaxation which measures the compressive stress relaxation of a polymeric sample. A small cylindrical sample (typically 0.5 inch diameter and about 0.25 inch thick) is compressed in two steps. The first step compresses the sample to a thickness of 4.5 mm and in a second step the sample is compressed again to a thickness of 3 mm. The first step is for conditioning and preheating the material. During the second compression step stress is monitored with time and a reference stress in units of psi is the stress at a pre-set reference time after the second compression. The relaxation time is the time between the reference time and the time at which the reference stress decays by a given percentage. The reference stress is a measure of the material's ability to resist a quick deformation (similar to a modulus) and the relaxation time is a measure of the ability of the polymer molecules to relax from a stressed state.

1. Sample Preparation

A. Molding

A disk of 1.25 inch diameter and 0.30 inch thick is compression molded using the following conditions:

Temperature −200° C. for non-halogenated polymers, 150° C. for halogenated polymers or 100° C. for filled compositions.

Preheat sample with no pressure for two minutes.

Raise the force to 15 tons (for a 9 cavity disk mold) and hold the pressure constant for 2 minutes.

Remove the mold and place it in a water cooled press for 5 to 10 minutes under a closing force of 15 tons.

B. SRPT Sample

Between two and three cylindrical samples are cut from the above disk using a ½ inch die.

C. SRPT Measurements

Before the test is started, temperature equilibrium is established. A test sample is placed at the center of the compression chamber and the test sequence is started. After the stress resulting from the second compression stage has decayed to the pre-set extent, the reference stress and relaxation time are recorded. Typically, an extent of decay from the reference stress of 50% or 75% is used.

D. Normalization

Green strength and stress relaxation values obtained for various materials can be normalized against a given material. This is accomplished by dividing each resulting reference stress by the reference stress for the standard material. The normalization should be done for measurements using idential parameters. However, after normalization, materials measured with one or more changes in the test parameters can still be compared if the standard material is the same material and was measured with both sets of parameters. For example, if the extent of decay is 75 percent in one set of tests and 50 percent in another set, both sets can be normalized against the same standard which is itself measured under both conditions. Since decay follows an exponential form, a normalized relaxation time is not strongly dependent on the extent of decay.

II. Gel Permeation Chromatography (GPC) Molecular Weight

A comprehensive description of the theory and practice of the now well known GPC technique can be found in "Modern Size-Exclusion Liquid Chromatography, Practice of Gel Permeation and Gel Filtration Chromatography" by W. W. Yau, J. J. Kirkland and D. D. Bly (John Wiley & Sons, 1979); further reference to this text will indicate the chapter and page of "GPC-Yau."

By way of generalization, GPC is an analytical procedure used for separating molecules by differences in size. The procedure as applied to polymers results in a concentration distribution of molecular weights. Most often, concentration is determined using differential refractive index (DRI) and the concentration v. time elution curve is related to molecular weight by means of a calibration curve based on a "known" standard. Utilizing low-angle laser light-scattering (LALLS) photometry in conjunction with DRI, direct determination of molecular weight can be made (GPC-Yau, Chapter 5.12, page 156 ff). Furthermore, the LALLS technique is more sensitive to, and more accurately determines very high molecular weight portions of the distribution (e.g., 1,000,000 and higher).

Molecular weight averages can be calculated based on the data obtained from a GPC test (GPC-Yau, Chapter 1.3, page 4 ff). The most frequently cited molecular weight averages are: number average ($M_n$), weight average (Mw) and Z-average (Mz). These averages are also referred to as the various moments of the distribution. For a monodispersed system (in which each molecule has the same molecular weight), the moments would equal one another, but for a polydisperse system Mz is greater than Mw which is greater than Mn. Higher molecular weight species have a greater influence on the Z and weight averages whereas lower molecular weight species more greatly influence the number average. The breadth of the distribution overall as well as parts of it can be characterized by reference to various ratios, e.g., Mw/Mn and Mz/Mw; the higher the values of the ratio, the broader the distribution of molecular weights. Furthermore, a multimodal distribution can be more accurately characterized by reference to a ratio which incorporates that portion of the distribution reflecting the mode of interest. For example, comparison between a polymer with a large concentration of a high molecular weight "tail" and the same polymer without such a tail would be more accurately reflected in the Mz/Mw ratio.

When a distribution of molecular weight is present in a polymer composition as a result of, e.g., the blending of two or more polymers or resulting directly from polymerization, such a distribution will have at least one peak in a plot of molecular weight versus concentration. For the purposes of this invention, peak molecular weight, identified as Mp, is that molecular weight corresponding to the maximum concentration in the polymer concentration-elution time GPC trace (chromatogram). Since GPC instruments do not usually operate with a strictly linear calibration relationship between the logarithm of molecular weight and elution time, such a maximum will be slightly displaced from the maximum in the differential weight distribution, $dW(M)/d \log M$. For rigorous comparison between different GPC instruments, it is necessary that the calibration, log M versus time, be essentially linear in the region of Mp, but minor discrepancies do not detract from the basic advance of the present invention.

For the case of a chromatogram with multiple peaks (corresponding to multiple compositional elements in the molecular weight distribution), Mp is identified as the molecular weight at the local maximum of the major component of the molecular weight distribution in the original GPC chromatogram trace. In general, such a major component comprises substantially linear molecules. For the purpose of this invention Mp does not correspond to the high molecular weight component of the distribution generated by the use of a branching agent during polymerization. Similarly, it does not correspond to the high or low molecular weight components blended to prepare a final polymer composition.

Identification of the peak molecular weight (Mp) of the polymer molecular weight distribution is significant because another defined characteristic of the distribution is keyed to it; the high ends fraction. For the purposes of this invention the high ends fraction of the molecular weight distribution is characterized by GPC analysis and comprises that portion of the distribution which is equal to and greater than four (4) times the peak molecular weight, Mp.

The meaning and significance in the field of polymers of the various GPC molecular weight distribution parameters as well as solution and neat polymer viscosities and structural parameters is described in "Science and Technology of Rubber," edited by F. R. Eirich (Academic Press, 1978); Chapter 3, "Structure Characterization in the Science and Technology of Elastomers," G. Ver Strate (hereinafter, Ver Strate, page designation).

The absolute molecular weights based on GPC analysis are assigned on the basis of an elution time calibration defined in terms of hydrodynamic volume or on the basis of light scattering intensity. For these two methods the following are the appropriate Mark Houwink and scattering parameters, all in tetrahydrofuran at 30° C.:

a) for butyl, $[\eta] = 5.0 \times 10^{-4} M^{.6}$ dl/g b) for polystyrene, $[\eta] = 1.25 \times 10^{-4} M^{.715}$ dl/g and for specific refractive index increment, for butyl, 0.107 ml/g at 633 nm for the light wavelength.

For linear molecules an elution time calibration based on commercially available polystyrene samples yields the same Mw as from light scattering.

The Mw from light scattering can be used with Mv to calculate a branching index as defined below. The Mw/Mv from elution time is also used in that index. This latter quantity is not significantly affected by long chain branching.

III. Viscosity

A. Mooney. A complete description of the test equipment and procedure can be found in American Society for Testing and Materials Standards, ASTM D1646, "Viscosity and Curing Characteristics of Rubber by the Shearing Disk Viscometer." Values reported herein will refer in a shorthand manner to the disk size (ML=large), sample warm-up and test run time e.g., 1+8) and test temperature (e.g., 100° C.); ML (1+8) 100° C.

B. Solution. Specific values of dilute solution viscosity are not directly reported but rather the calculated value of molecular weight based on such viscosity. Tests for butyl and polyisobutylene are performed using diisobutylene as the solvent, typically at 20° C. and at a concentration in the range of 0.5 to 1.0 milligrams per milliliter. Viscosity average molecular weight is calculated using the Mark-Houwink equation: specific viscosity = $KMv^a$ where $K = 34.4 \times 10^{-3}$, and $a = 0.64$ see Ver Strate, pages 93–95) with specific viscosity in deciliters per gram.

IV. Branching

A general discussion of branching can be found in GPC-Yau, Chapter 12.8, pages 399–401 and VerStrate, pages 107–111. Terms that are frequently used include:

A. Linear chain. This is generally taken to mean a linear backbone of the homopolymer or copolymer with no branches from the backbone. However, a standard, or reference material which may contain a limited number of branches will sometimes be referred to as a linear chain.

B. Random branches. Includes short and long chain branching (LCB) which will be stated as such. Although the expression is qualitative in nature, long implies molecular weight of the branch which is similar in magnitude to that of the linear backbone.

C. Star branches. Refers to several (typically linear) branches (e.g., 3, 4 or 6) eminating from the same or closely spaced branch point on the backbone.

Representational figures of branched molecules can be found in the reference Yau at page 450.

D. Branching Index. In an effort to quantify long chain branching the term branching index will be used. On a theoretical basis, the branching index is a function of the intrinsic viscosity of the branched to the linear polymer on a constant basis such as weight average molecular weight. Since for a given molecular weight, a branched molecule has a smaller radius of gyration than its linear counterpart, the branching index, g, will be less than 1.0, and the lower the value, the more highly branched the polymer. For the purposes of this disclosure the branching index is defined as follows:

$$g = \left[ \frac{(Mv)\, SOLN}{(Mw)\, LALLS} \cdot \left(\frac{Mw}{Mv}\right) GPC \right]^{a/b}$$

(Mv) SOLN = viscosity average molecular weight measured in diisobutylene and calculated using the Mark-Houwink equation.

(Mw) LALLS = weight average molecular weight as determined using a low angle laser light scattering detector in a GPC unit.

(Mw/Mv) GPC = indicated molecular weights as determined by GPC using differential refractive index detector.

a = Mark-Houwink parameter = 0.64 for polyisobutylene and isobutylene-isoprene copolymers
 b = empirically determined parameter = 0.7±0.2 for many polymers; it relates the ratio of the intrinsic viscosity of branched and linear polymers of the same molecular weight to the ratio of their radii of gyration.

For ease of calculation, the exponential power a/b can be treated as equal to 1.

Green strength, viscosity and elastic memory are important properties affecting the processability of polymers and compounds in various end-use applications, e.g., tire fabrication. Tire innerliner compounds, for example, require low elastic memory. It would be expected that this property would be enhanced by lower viscosity, but it must be balanced against the need to maintain acceptable green strength which directionally increases as viscosity increases. Lower viscosity polymers are also preferred for easier mixing and calendering.

As previously discussed, balancing such properties to achieve an acceptable composition is particularly difficult. Halogenated butyl rubber, e.g., chlorinated and brominated butyl rubber, has become the material of choice for tire innerliner compositions in view of its outstanding air permeability characteristics. With significant effort by rubber manufacturers and tire manufacturers, compositions have been developed with processing properties acceptable for the practical, commercial environment. However, it has been a significant objective to obtain improvements in these properties, and, in particular, improvements which are not dependent on additional additives or difficult-to maintain process conditions. This has been a particularly difficult objective to achieve with compositions containing high percentages of halogenated butyl rubber (for example, up to an including 100 percent of the rubber component), which compositions demonstrate the best air holding characteristics.

One means for achieving the improved properties disclosed herein is by blending polymers or polymer fractions of widely differing and defined molecular weights to produce "tailor-made" molecular weight distributions. This results in polymers and polymer compositions with the unique combination of green strength levels attributable to higher molecular weight butyl polymers combined with lower viscosity and lower elastic memory (faster stress relaxation) attributable to lower molecular weight butyl polymers.

The effect of blending can be achieved in a direct synthesis process by utilizing the product produced by two or more polymerization reactors operating in parallel or series or two or more polymerization zones in a single vessel wherein the resulting polymers are mixed. In this manner, each zone or each reactor produces a polymer with molecular weight and molecular weight distribution characteristics emphasizing specific region(s) of the molecular weight distribution of the desired final product. Combining the output of the zones or reactors, the blended product incorporates the essential features defined herein.

When blending or direct synthesis means as described are used to achieve the improved properties, the resulting polymer will have a molecular weight distribution such that Mz/Mw is equal to or exceeds 2.0, preferably is equal to 2.0 to about 11.0, more preferably about 2.5 to about 10.0, most preferably about 3.5 to about 9.0. Where blending means are used it is convenient to refer to three polymer components for achieving the desired molecular weight distribution of the blended composition, namely a high molecular weight component, a low molecular weight component and a moderate molecular weight component wherein the sum of the three equals 100 percent. Naturally fewer or greater numbers of components differing in molecular weight can be used to achieve the same end, but three represent a practical compromise. In order to achieve the desired end result, useful polymer blend components are:

| Molecular Weight Component | Mv × 10⁻⁵ | Mw/Mn | Crosslinking Functionality* |
|---|---|---|---|
| (A) High | 15–30 (18–27) | 1.5–3.0 (1.8–2.7) | .1–.3(.2) |
| (B) Low | 1.5–2.5 (1.8–2.2) | 3.0–6.0 (3.5–5.0) | 1.2–2.2(1.4–2.0) |
| (C) Moderate | 3.0–4.0 (3.3–3.7) | 2.5–5.0 (3.0–4.0) | .6–.9(.8) |

*For 90% network perfection.

The values in parentheses are considered preferable to those first expressed. The high molecular weight component is blended at a concentration of about 8 to about 25 weight percent, preferably about 10 to about 20, most preferably about 12 to about 18, for example about 14 to about 16; the low molecular weight component at about 0 to about 20 weight percent, preferably about 0 to about 15, most preferably about 1 to about 12, for example about 2 to about 10; the moderate molecular weight component is employed at a concentration such that the sum of the components equals 100 percent.

Functionality (e.g., halogen and/or unsaturation) of the blend component is a consideration where strength of the vulcanized or crosslinked composition is a significant factor. Some applications or uses may permit the use of a polymer blend in which molecular network perfection is less of an important factor and therefore functionality can be viewed as a secondary consideration. The contribution of functionality of each component to the crosslinked network will vary depending on the molecular weight of the component to be blended e.g., broadly speaking, less functionality is required for a high molecular weight component than for a low in order to incorporate each into a crosslinked network. As will be shown in the examples, even homopolymer polyisobutylene can be used as a high molecular weight component for blending to achieve the desired green strength and stress relaxation in the final mixture.

Since the blending approach allows for selection of composition as well as molecular weight and molecular weight distribution of the blended components it is appropriate to describe the method by which selection can be made where the final blended polymer is to be crosslinked or vulcanized (cured) in a composition for end use application, cure response is an important consideration. The general relationship referred to above is quantitatively defined by equations presented in a paper by F. P. Baldwin, et al. entitled "Elastomeric Prepolymers for Adhesives and Sealants Provide Improved Strength and Versatility" (Adhesives Age, February 1967), incorporated herein by reference:

$$f = \frac{100\,m}{Mn} \cdot \left[ \frac{1 + Sa}{1 - Sa} - 1 \right]$$

where
- f = functionality of the polymer, mole percent
- m = average molecular weight of the monomer units making up the chain based on their mole fractions in the polymer (for a copolymer such as butyl rubber, substantially polyisobutylene, it is approximately 56),
- Sa = degree of network perfection, i.e., the fraction of network chains which are bounded at each end by a crosslink and hence will contribute to the support of stress.

The equation is an idealized representation since it assumes complete utilization of functionality to crosslinks. By way of example, if a low molecular weight, e.g., Mn=65,500, isobutylene-isoprene copolymer is used, the amount of unsaturation required to achieve 90% network perfection is 1.5 mole percent, whereas a 95% network requires 4.3 mole percent. In contrast a copolymer approximately twice the molecular weight, Mn=127,000 requires unsaturation levels of 0.8 and 1.7 mole percent, respectively. Using a copolymer of significantly higher molecular weight, Mn=503,000, reduces the necessary unsaturation still further, 0.2 and 0.4 mole percent, respectively. Using this approach, the amount of functionality can be readily ascertained and the values exemplified herein can be used as guidelines.

The presence of branching in compositions prepared by blending of components depends on branching present in the component itself. With regard to branching, more is disclosed below.

The polymers of the present invention, hereinafter collectively referred to for the sake of convenience as butyl rubber, can also be produced directly during polymerization, e.g., in a single continuous stirred tank reactor. Generally, such polymers will have highly branched structures by incorporating, during polymerization, crosslinking or cationically active comonomers or agents. These agents are referred to as branching agents and preferably are, or contain, structural features which are soluble in the polymerization diluent. More preferably, such branching agents are used in conjunction with, or are themselves, stabilizers for the polymer slurry when such a slurry results, e.g., butyl rubber in methyl chloride (see U.S. Pat. Nos. 4,252,710, 4,358,560 and 4,474,924 described earlier). However, the slurry stabilizers described in these patents were recognized as either being chemically inert with respect to the cationic polymerization process (e.g., substantially fully extractable from the polymer after polymerization) or chemically bonded to the polymer (see '924, column 4, lines 43—column 5, line 7). The disclosure of bonding was limited to the concept of forming an in situ stabilizer with the preformed copolymer stabilizer acting as a functional lyophile and the product polymer a lyophobe. The prior art was unaware of the concept of using specific types and concentrations of additives as branching agents to control molecular weight distribution in order to effect particularly desirable properties in the product polymer. The present invention discloses a new control variable for producing such preferred polymeric products.

The introduction of branching, preferably long chain branching, results in a modification of the molecular weight distribution, and molecular chain configuration, as referred to earlier. Such changes, if controlled in the manner taught, result in advantageous properties and provide a means for achieving these properties. Since branching is introduced selectively and in a controlled manner, the lower molecular weight polymer species are substantially branch free, i.e., those species with molecular weights less than the peak molecular weight, Mp. Based on the branching index equation previously defined, substantially branch free means a distribution or a portion thereof which would have a branching index value, g, of greater than 0.9. The disclosure hereinbelow and the examples demonstrate the manner in which such polymerization selectivity is achieved.

The nature of the polymerization diluent can have important effects on the polymer produced. Similarly important is the solubility of the branching agent under polymerization conditions throughout the entire course of the polymerization. As butyl rubber is normally produced by slurry polymerization in methyl chloride diluent, the polymer precipitates out of solution as it is formed. Consequently, when a branching agent is incorporated, it is removed from solution and may become buried within the polymer particle so that the additional sites are no longer available in the solution phase for subsequent reaction. The actual branching reactions may be forced to occur within the precipitated butyl polymer in a very different and much more poorly controlled way than had the branching agent remained in solution. Gel formation is much more likely when the reactions occur within the precipitated polymer than when they occur more homogeneously in the solution phase. Furthermore, the amount and nature of the gel produced is highly dependent upon the catalyst quenching conditions and control is rendered very difficult. Solution polymerization of butyl rubber in diluents such as aliphatic hydrocarbons like pentane, hexane, or heptane is advantageous from a control viewpoint, when it is desired to produce highly branched polymers. Optimum control of the branching reactions is achieved when they are totally effected homogeneously in solution and then all catalyst and active species are killed by quenching prior to precipitation of the polymer. As noted above, this can be accomplished by polymerizing butyl rubber in a suitable inert diluent which is a good solvent for the polymer and the branching agent. However, branched structures, which significantly modify the molecular weight distribution can also be achieved through the inclusion of reactor-diluent-soluble moieties containing multiple, cationically reactive sites, particularly in conjunction with slurry stabilizers (as previously discussed to prevent reactor fouling with insoluble gel).

Slurry stabilizers stabilize butyl dispersions produced during polymerization in a diluent such as methyl chloride, and prevent the mass agglomeration of slurry particles. Hence, slurry stabilizers make it possible to produce dispersed butyl particles containing gel in the reactor without depositing fouling rubber containing gel on the heat transfer surfaces. Through the use of slurry stabilizers it is possible to produce a modified butyl rubber containing as much branching and/or gel as is desired in a practical manner without interfering with the ability to wash the reactor in order to prepare it for reuse.

Furthermore, through appropriate choice of the branching agent and the amount used, it is possible to exert considerable control over the branching process so that the desired changes in molecular weight distribution are achieved. Since crosslinking agents tend to introduce random long chain branching they modify the entire molecular weight distribution of the polymer. On the other hand, soluble moieties containing multiple reactive sites can be used to introduce a controlled amount of a high molecular weight branched fraction into the distribution without modifying the entire molecular weight distribution of the polymer. A small amount of a very highly functional and reactive soluble moiety can be used to introduce a small amount of very high molecular weight highly branched material into the distribution. Conversely, a larger amount of a less reactive, lower functionality moiety can be used to introduce more of the branched fraction, but of lower molecular weight.

The cationically reactive branching agents for use in producing the polymers of this invention are present during polymerization in an amount effective for producing the desired changes in molecular weight distribution. Such amounts vary depending on the number and reactivity of the cationically active species, including such variables as molecular weight and reactivity of the agent (particularly that portion of the agent containing the cationically active moiety). Additionally, polymerization conditions influence the effective concentration, e.g., batch versus continuous, temperature, monomer conversion, etc. Generally such agents are present in an amount, based on the monomers, greater than about 0.3 weight percent e.g., about 0.3 to about 3.0 weight percent, preferably greater than about 0.35 weight percent e.g., about 0.35 to about 2.8 weight percent, more preferably greater than about 0.4 weight percent e.g., about 0.4 to about 2.7 weight percent, most preferably greater than about 0.45 weight percent e.g., about 0.45 to about 2.6 weight percent, for example greater than about 0.5 weight percent e.g., about 0.5 to about 2.5 weight percent. Reagents which are not excessively reactive can be used in a commercial process at, e.g., about 1.1 to about 2.0 weight percent. The upper limit of concentration is limited to that concentration which causes the final polymer product to be gelled to an extent which is unacceptable for the intended use of the product.

A particularly desirable method of introducing the desired high molecular weight ends branching is to combine the functions of the slurry stabilizer and the branching agent in one species by use of a slurry stabilizer with multiple active sites in an anchor group. The lyophilic portion of the slurry stabilizer solubilizes the anchor group, which contains multiple active sites to produce the desired branched fraction during polymerization, and the lyophilic portion then forms the protective shield around the butyl slurry particles to provide steric slurry stabilization. Block copolymers of polystyrene and polybutadiene or polystyrene and polyisoprene are examples of molecules which combine the functions of slurry stabilization and branching agent when butyl rubbers are polymerized in methyl chloride diluent as in commercial butyl rubber processes. The crosslinking comonomer and/or species containing multiple reactive sites is preferentially soluble under polymerization conditions because then it is more effectively utilized and the branching reactions can be better controlled. Since the crosslinking comonomers are typically low molecular weight liquids, they are soluble in the polymerization diluent of interest, but species containing multiple reactive sites are normally polydienes with limited solubility in the normal butyl polymerization diluent (e.g., methyl chloride) under reaction conditions. The solubility requirement often limits the molecular weight of polydiene which can be used unless it also contains groups which enhance methyl chloride solubility. The choice of these solubilizing groups is restricted by the consideration that they must not poison the polymerization catalyst used or interfere with the polymerization. As noted above, it is particularly desirable that the solubilizing group be a lyophilic polymeric chain that can act as a slurry stabilizer so that it serves dual functions. The use of solubilizing groups makes it possible to utilize higher molecular weight polydienes during slurry polymerization of butyl rubbers in methyl chloride diluent and, hence, makes possible the production of a more highly branched, high molecular weight mode during polymerization. The polymerization diluent can also be changed to one in which the polydiene is more soluble but such a major process change is less desirable from economic and process viewpoints.

The ability to vary the reactivity of the unsaturated groups as well as their number per chain affords considerable flexibility in producing a butyl rubber with the desired modification in molecular weight distribution. For example: the Type IV unsaturation in a 1,4-polyisoprene chain is very active under butyl polymerization conditions and becomes extensively involved in branching reactions whereas the Type II unsaturation in a 1,4-polybutadiene is very much less active and, hence, becomes much less extensively utilized in branching reactions under any given set of conditions. Therefore, a very low molecular weight polyisoprene (e.g., 500–2500 molecular weight) which is still soluble in methyl chloride can be used to introduce a highly branched fraction during butyl polymerization. The same number of branches can be achieved by using a much higher molecular weight polybutadiene containing far more unsaturation per chain, but the polybutadiene would need to be solubilized in the methyl chloride (e.g., by being present in a block copolymer with a solubilizing agent such as polystyrene) and would produce a different polymer with a lower branching density in the high molecular weight fraction or mode.

Characterization of olefinic residues as Type II, Type IV, etc. is based on the Boord Classification described by Schmidt and Boord in J.A.C.S. 54,751 (1932) and also disclosed in U.S. Pat. No. 4,245,060 (column 3, lines 1–30), both incorporated herein by reference.

Not intending to be bound by theory, it is believed that the mechanism by which the crosslinking comonomers and soluble moieties containing multiple reactive sites function to produce branching is similar and may be described as a "graft onto" or "grow-through" mechanism. A growing butyl chain attacks one of the reactive sites on the comonomer or soluble moiety containing multiple reactive sites to become attached to it (and can propagate through it) leaving the remaining unsaturated sites available for similar attack to produce a branched butyl polymer with two or more butyl chains attached to the same moiety. With a crosslinking comonomer, only two butyl chains can become attached and so random long chain branching results and gel is produced whenever the critical branching value of two per chain is reached. However, when a moiety containing multiple reactive sites is used, the number of butyl chains attached to that moiety can be as many as desired since such chains do not contain active branching functionality and tend to terminate after attachment. It is controlled by setting the number and reactivity of the reactive sites and the amount of branched butyl produced can be controlled by the amount of reactive moiety added to the polymerization. A high molecular weight ends mode, with many butyl chains attached to the reactive moiety, is produced with the remainder of the butyl distribution being unaffected. The molecular weight amount and density in the high molecular weight ends mode are all subject to some degree of independent control. Judicious use of a soluble moiety containing multiple reactive sites is a more flexible and controllable way of achieving the desired change in molecular weight distribution than is use of a crosslinking comonomer.

It is preferred to use soluble moieties containing multiple reactive sites as the branching agent because their use makes it possible to conduct the branching reactions much more nearly in the solution phase even when methyl chloride is used as the diluent. This is so because the solubilizing groups used with the polydiene tend to keep it in solution or at least at the surface of the precipitated butyl particle even after a butyl chain has become attached to it. This is especially so when the solubilizing group is a lyophilic polymer chain so that the polymeric branching agent is a slurry stabilizer and becomes attached to the butyl particle surface to keep the remaining unreacted sites relatively available for branching reactions. Nevertheless, in slurry polymerization processes, dormant species and catalyst are trapped within the precipitated butyl rubber slurry particle where they can produce additional poorly controlled branching reactions and/or gel formation as the particles warm on leaving the reactor. Thus it is especially important when branching agents are used in a slurry polymerization process to efficiently and rapidly quench the slurry to kill all the catalyst and active species before the slurry is allowed to warm.

As disclosed herein, it is possible to go one step further and to conduct the polymerization process as a solution polymerization. Solution polymerization also permits the direct use of polydienes are partially hydrogenated polydienes as the branching moiety without the need for other solubilizing groups on the polydiene. Thus polybutadiene, polyisoprene, polypiperylene, natural rubber, styrene/butadiene rubber and ethylene--propylene diene monomer rubber can all be employed as the branching moiety during solution polymerization of butyl rubbers in a solvent such as hexane.

The reactive site or functional group on the functional lyophile participates in the polymerization as discussed above and becomes the site at which the butyl chain becomes attached to form the block or graft copolymer. If the functional lyophile contains more than one functional group, then a butyl chain can become attached at each functional group and a number of butyl chains become attached to the lyophile. The multifunctional lyophile then becomes a means of linking many butyl chains together (by virtue of their attachment to the same lyophile molecule). The number of butyl chains which are linked together, and thus the molecular weight of the linked moiety, is easily controlled by controlling the functionality of the multifunctional lyophile. Hence, a high molecular weight end mode of any desired molecular weight is readily prepared in situ during polymerization. The architecture of the linked moiety can also be controlled by the spacing of the functional groups on the multifunctional lyophile. Thus a cluster of butyl chains can be attached at intervals along the lyophile chain. In addition, the amount of the multifunctional lyophile added to the polymerization controls the amount of the high ends fraction formed. This is a convenient method to control the amount, nature and molecular weight of the high ends mode.

Generally, modification of the molecular weight distribution is achieved by incorporating during polymerization of the polymers an effective amount of functional reagent selected from the group consisting of polymers and copolymers comprising functional groups capable of copolymerizing or forming a chemical bond with the product polymer, the functional group comprising cationically active halogen or cationically active unsaturation and such polymers and copolymers preferably comprising lyophilic polymerization diluent soluble moiety.

Classes of functional polymeric reagents which are useful are represented by the following formulii:

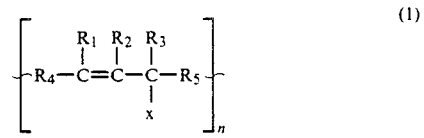

(1)

wherein $R_1$, $R_2$ and $R_3$ = hydrogen or alkyl group $R_4$, $R_5$ = alkyl group x = halogen, e.g. chlorine or bromine n = 4–100 alkyl group having 1 to 15 carbon atoms, preferably 1 to 4; non-limiting examples include methyl and ethyl.

Suitable reagents in this class include chlorinated butyl and brominated butyl.

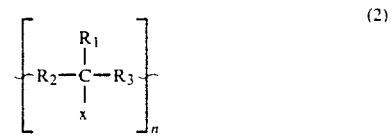

(2)

wherein $R_1$ = alkyl (e.g., as in (1), above) or aryl $R_2$, $R_3$ = alkyl x = halogen, e.g., chlorine or bromine n = 4–100 aryl group, including phenyl and tolyl.

Suitable reagents in this class include hydrochlorinated polyisoprene, hydrobrominated polyisoprene, isobutylene-vinylbenzyl chloride copolymer and chlorinated polystyrene.

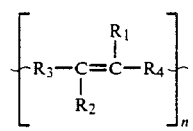
(3)

wherein $R_1$, $R_2$ = hydrogen, alkyl (as in (1) or (2) above), aryl (as in (2) above) or alkenyl $R_3$, $R_4$ = alkyl n = 7-1,000 alkenyl group including ethene and propene

Suitable reagents in this class include polybutadiene, polyisoprene and polypiperylene.

As discussed previously with regard to the blending of polymers, molecular weight and molecular weight distribution criteria are critical for obtaining the desired polymer products and achieving the unique balance of properties, i.e., green strength and stress relaxation. The amount of branching agent fed to the reactor and polymerization conditions, e.g., conversion, should be controlled in order to obtain useful polymers, i.e., those with high ends fraction of from about 8 to about 25 weight percent; preferably about 10 to about 20, most preferably about 12 to about 18, for example about 14 to about 16 weight percent. As described previously, for the purposes of this invention, the amount of high ends fraction in useful polymers comprises that portion of the molecular weight distribution which is equal to or greater than 4 Mp, preferably about 5 Mp, most preferably about 6 Mp, for example about 8 Mp. Useful polymers are obtained when the peak molecular weight of the polymer, Mp, is greater than about 250,000; it is preferable that Mp is about 250,000 to about 850,000; more preferably about 270,000 to about 800,000; most preferably about 290,000 to about 750,000; for example about 300,000 to about 700,000.

Compositions can also be prepared by utilizing the principles of the blend approach, described hereinbefore, in combination with directly polymerized branched polymers. Useful compositions are prepared by blending highly branched polymers with polymers that are essentially linear. The resulting composition has the desirable green strength and stress relaxation characteristics when the blended composition has the defined molecular weight criteria.

Many properties of a rubber (such as extrusion rate, die swell, mixing time, filler dispersion, cold flow, green strength, tire cord stike-through, building tack, adhesion, the various vulcanizate properties, etc.) are strongly influenced by its molecular weight distribution and branching. Different balances between these various properties can be achieved by varying the molecular weight, molecular weight distribution and branching. Thus, the techniques of this invention for introducing controlled amounts and types of branching into butyl rubbers and for modifying their molecular weight distributions in a controllable manner enables production of specialized grades of butyl rubber which are especially suitable for particular applications. These techniques make it possible to achieve a better compromise between the various and often conflicting properties desired in a rubber formulation during processing, fabrication and end use in a particular application. Particularly advantageous properties are obtained from halogenated butyl rubber prepared using the butyl polymers described herein for subsequent halogenation. The halogenated polymers, e.g., brominated butyl and chlorinated butyl can be used to produce tire innerliner compositions with improved processing properties such as higher green strength, and faster stress relaxation compared to similar halogenated butyl compositions absent the modified structure and molecular weight distribution.

The polymers of this invention, wherein green strength and stress relaxation rate have been increased, are particularly useful in compositions for products produced by extrusion, calendering, and injection, transfer and compression molding. Such products include tire components such as sidewalls, sidewall veneers, carcasses and treads, innertubes, wire and cable, hose, sheeting, film, automotive and mechanical goods, sponge products, pharmaceuticals, adhesives, sealants, etc. The polymers are also particularly useful in blends comprising other elastomers and plastics, including cured compositions as well as thermoplastic and dynamically vulcanized blends. One skilled in the art will recognize that such compositions can typically include additional components such as reinforcing and nonreinforcing fillers, extenders and plasticizers, process aids, antioxidants and antiozonants, colorants, etc.

The invention is further illustrated by the following examples which are not to be considered as limiting its scope.

EXAMPLE 1

Polymer compositions were prepared by blending polymers differing in molecular weight. The compositions were blended in solutions of 10% by weight polymer in hexane, then steam stripped and dried on a rubber mill. The resulting polymer blends were then tested according to the tests described earlier. The polymers prepared in these blending experiments where characterized using the GPC method without the low angle laser light scattering (LALLS) detector which was later found to affect the determination of high molecular weight components (subsequent tests using LALLS indicated a decrease of about 0.4 units for the value of Mz/Mw as compared to values measured by refractive index).

The blends were prepared using as the high molecular weight component (Mv = 2,100,000), polyisobutylene manufactured by Exxon Chemical Co. and designated Vistanex ® L-140; as the moderate molecular weight component, butyl rubber manufactured by Exxon Chemical Co. and designated Butyl 365 (IIR is an accepted generic abbreviation for butyl, isobutylene-isoprene rubber); as the low molecular weight component, low molecular weight butyl rubber (Mv = 220,000), designated as IIR LM W. The other, commercially available polymers, are also manufactured by Exxon Chemical Co. and are identified as follows: CIIR 1065 = Chlorobutyl rubber, grade 1065; CIIR = 1066 = Chlorobutyl rubber, grade 1066; CIIR = 1068 Chlorobutyl rubber, grade 1068; IIR 268 = butyl rubber, grade 268. Test results are reported in Table 1 for blends demonstrating the improved properties of the invention (blends A and B).

TABLE 1

|   | Mz/Mw | 4 Mp, High Ends, wt. % | Mooney Viscosity[a] | Green Strength, psi | Relaxed Stress, psi |
|---|---|---|---|---|---|
| 1 IIR 365 | 2.2 | 5.0 | 44 | 28.0 | 6.4 |
| 2 CIIR 1065 | 2.4 | 4.0 | 42 | 27.6 | 7.9 |
| 3 Blend A[b] | 2.8 | 8.0 | 45 | 29.3 | 8.0 |
| 4 CIIR 1066 | 2.5 | 4.0 | 55 | 29.7 | 10.3 |
| 5 Blend B[c] | 3.0 | 11.0 | 49 | 32.4 | 10.1 |
| 6 CIIR 1068 | 2.4 | 4.0 | 71 | 31.9 | 12.8 |
| 7 IIR 268 | 2.1 | 3.3 | 69 | 32.2 | 12.1 |

[a]ML 1 + 8 at 100° C.
[b]Composition: 10% Vistanex L-140 ($M_V$ = 2.1M), 80% IIR 365 ($M_V$ = 320K), 10% IIR LMW (Mv = 220 k).
[c]Composition: 15% Vistanex L-140, 85% IIR 365.

Comparison of polymers 1 through 4 shows that blend A exhibits the green strength of a higher Mooney viscosity rubber like CIIR 1066, at viscosity and stress relaxation levels comparable to lower Mooney viscosity polymers like CIIR 1065 or IIR 365. Comparing polymers 4–7 shows that blend B displays the green strength of CIIR 1068 or IIR 268 and the stress-relaxation capability of CIIR 1066, at significantly lower viscosity than these polymers. Stated another way, the experimental blends with molecular weight distribution features selected to improve specific performance properties exhibited higher green strength and faster stress relaxation compared to typical, commercial polymers of equivalent Mooney viscosity.

Polymers blends were also evaluated in compositions further comprising carbon black, rubber process oil and other ingredients typically used in end use applications, e.g., a tire innerliner formulation. The composition was mixed in a laboratory internal mixer (size B Banbury ®) using the following formulation (parts by weight):

| Polymer | 100 |
|---|---|
| Carbon Black (type N660 GPF) | 50 |
| Naphthenic Process Oil[a] | 8 |
| Processing aid[b] | 7 |
| Stearic acid | 2 |
| Magnesium oxide[c] | 0.15 |
| Zinc oxide | 3 |
| MBTS[d] | 1 |
| Sulfur | 0.5 |

[a]Flexon ® 641 (Exxon Chemical Co.)
[b]Struktol ® 40MS (Struktol Co.)
[c]Maglite ® K (Merck)
[d]2,2'- Benzothiazyl disulfide Several additional blends were prepared with different proportions of high molecular weight polyisobutylene (grade Vistanex L-140) and butyl rubber (grade Butyl 365) as indicated in footnote (c) of Table 1 above. For comparative purposes, commercially produced samples of halogenated butyl differing in Mooney viscosity were also tested. The blends and test results are summarized in Table 2a and illustrated in FIG. 1.

TABLE 2 a

| Polymer | Blend[a] High MW | Blend[a] Moderate MW | Green Strength, psi[b] | Relaxed Stress, psi[c] |
|---|---|---|---|---|
| Blend 1 | 8 | 92 | 30.0 | 4.7 |
| Blend 2 | 15 | 85 | 31.4 | 5.0 |
| Blend 3 | 25 | 75 | 34.4 | 6.2 |
| Blend 4 | 45 | 55 | 39.7 | 9.4 |
| CIIR 1065 (I) | — | — | 29.6 | 4.6 |
| CIIR 1066 (II) | — | — | 32.3 | 7.0 |

TABLE 2 a-continued

| Polymer | Blend[a] High MW | Blend[a] Moderate MW | Green Strength, psi[b] | Relaxed Stress, psi[c] |
|---|---|---|---|---|
| CIIR 1068 (III) | — | — | 33.7 | 9.1 |

[a]Blend 2 corresponds to Blend B of Table 1.
[b]Peak stress value as shown in FIG. 1.
[c]4 minute stress as shown in FIG. 1.

From an examination of the data as shown in FIG. 1, it is immediately apparent that the blend properties are significantly different in kind compared to the commercially produced polymers. The blend compositions, particularly those with sufficient high molecular weight ends, exhibit significantly lower 4 minute relaxed stress than standard polymers at equivalent levels of green strength. Testing of the innerliner compositions for green strength and stress relaxation was accomplished by using a sample calendered to approximately 0.070 inches thickness and tested as previously described.

The manner in which the molecular weight distribution is modified, e.g., broadened, can significantly affect properties. Specific compositional features are necessary for improved properties, and broadening can be excessive as well as inadequate. Additional polymer blends were prepared as described above in order to achieve altered molecular weight distributional features, Table 2b. Blend A is the same composition as above (which had improved properties compared to a higher Mooney viscosity commercial polymer. In Blend C, the amounts of both high and low MW components were increased to 20%. This resulted in essentially no change in Mooney viscosity or green strength, but a 10% increase in the relaxed stress level.

In the second group of samples in Table 2b, Butyl 365 is compared with two blend compositions of slightly lower Mooney viscosity. Blends D and E both contain increased amounts of the low MW component with the high MW component held at 20%. This results in lower green strength levels than Butyl 365, and slower relaxation (higher relaxed stress levels).

TABLE 2 b

Properties of Polymer Blend Compositions[a]

|   | Mz/Mw | 4 Mp, High Ends, wt. % | Mooney Viscosity[a] | Green Strength, psi | Relaxed Stress, psi |
|---|---|---|---|---|---|
| Blend A | 2.8 | 8.0 | 45 | 29.3 | 8.0 |
| Blend C[b] | 2.7 | 11.0 | 46 | 29.3 | 8.8 |
| Butyl 365 | 2.2 | 5.0 | 44 | 28.0 | 6.4 |
| Blend D[c] | 2.8 | 11.0 | 41 | 26.8 | 7.6 |
| Blend E[d] | 3.0 | 6.0 | 40 | 26.0 | 6.5 |

[a]ML 1 + 8 at 100° C.
[b]Composition: 20% Vistanex L-140, 60% IIR 365, 20% IIR LMW
[c]Composition: 20% Vistanex L-140, 30% IIR 365, 50% IIR LMW
[d]Composition: 20% polyisobutylene containing a low concentration of isoprene (Mv = 1.0M), 45% Butyl 365, 35% IIR LMW (Mv = 170 k)

EXAMPLE 2

A series of batch dry box polymerizations were run to show the effect of low levels of a low molecular weight reactor-diluent-soluble polyisoprene polymer on the molecular weight distribution of butyl rubber slurry polymerized in methyl chloride diluent. The low molecular weight soluble polyisoprene used in this series of batch polymerizations was identified as AI-8803-084-5. It was prepared by "living" anionic polymerization of highly purified isoprene in cyclohexane diluent using secondary butyl lithium catalysis. It was a narrow molecular weight distribution liquid polymer with a molecular weight of 530 by GPC. This liquid polyisoprene was primarily an isoprene heptamer initiated from a secondary butyl group. It was readily soluble in methyl chloride or a typical butyl feed blend and contained about seven reactive double bonds per chain. Each polyisoprene molecule was thus capable of tying seven butyl rubber chains together (if all the unsaturated sites were utilized) to form a bush-type branched fraction consisting of seven butyl chains attached to each polyisoprene molecule. The amount of this high ends branched fraction is readily controlled by varying the amount of polyisoprene added to the polymerization.

The batch dry box polymerizations were conducted as follows: the polymerizations were conducted in a 500 ml. 3-neck reaction flask setup in a glove box having an oxygen-free and moisture-free nitrogen atmosphere. The flask was cooled to $-95°$ C. by immersion in a controlled temperature liquid nitrogen cooled heat transfer bath. It was fitted with a thermometer, cooled dropping funnel and stirrer. Typically the flask is charged with 460 g. of a feed blend in methyl chloride and then a catalyst solution in methyl chloride is slowly dripped in to initiate polymerization while stirring of the bath is continued in order to maintain the desired polymerization temperature. The feed blend is typically defined by a "B" number, e.g., B-3. The B number is a shorthand reference of the approximate weight percent concentration of isoprene relative to isobutylene, e.g., 3.0 g. isoprene with 97.0 g. isobutylene calculates as 3.09 and is cited as B-3.

After sufficient catalyst solution has been added to make the desired amount of polymer, the polymerization is quenched by addition of cold methanol (typically 25 ml.) and then transferred to a vented hood where it is allowed to warm and flash off the methyl chloride and unreacted monomers. Additional methanol containing a trace of butylated hydroxytoluene (BHT) stabilizer is added as the reactor liquids flash off in order to protect the polymer from degradation prior to recovery. After the monomer is completely flashed off, the polymer is kneaded and washed in isopropanol to remove catalyst residues and then vacuum oven dried at 80° C. with 0.2 wt. % BHT added as an antioxidant. The dried polymer is then used for evaluation and characterization. In the control run, 1, the reaction was charged with a 10.9 wt. % B-3 feed in methyl chloride and chilled to $-97°$ C. before the 0.3 wt. % EADC catalyst solution was dripped in to produce polymer. Catalyst solution was dripped in slowly over the course of five minutes while stirring and maintaining temperature between $-97°$ and $-93°$ C. before quenching and recovering the polymer as usual. In the control run a 53% conversion of monomer to polymer was realized and the recovered, dried polymer was a tough, rubbery, butyl polymer with a viscosity average molecular weight of 431,000, Mp of 420,000 and INOPO of 9.5 (approx. 1.4 mole % isoprene). GPC analyses showed the polymer to have a typical butyl molecular weight distribution skewed toward the low molecular weight species with an Mz/Mw ratio of 1.7 and less than about 0.7% in the high ends (calculated, in this and succeeding examples, as the amount of polymer present in the molecular weight distribution at molecular weights equal to and greater than 4 Mp).

In companion run 2, the same feed blend was used with 0.5 wt. % on monomers of the low molecular weight polyisoprene AI-8803-084-5, added. It was readily soluble and dissolved quickly in the feed blend. The 0.3 wt. % EADC catalyst solution was dripped in slowly over the course of 17 minutes while stirring and maintaining temperature between $-97°$ and $-94°$ C. to produce polymer. After quenching and recovery, 16.50 g. (33% conversion) of a tough, rubbery butyl polymer with an Mv of 308,000 and Mp of 270,000 was obtained. The low molecular weight polyisoprene apparently contained some poisons as about twice as much catalyst was required as in the control run to produce polymer and the polymer viscosity average molecular weight was reduced from 431,000 to 308,000. Nevertheless, molecular weight distribution broadening with the production of a high molecular weight tail was achieved (estimated to be about 4%). The polymer had an Mz/Mw ratio of 2.1 by GPC using an RI (refractive index) detector and a higher Mz/Mw ratio of 3.4 using LALLS to better resolve the high molecular weight species. It contained 1.1 mole % enchained isoprene with 0.9 wt. % of the low molecular weight polyisoprene mainly incorporated in the high ends tail. In a second companion run 3, a higher level of the low molecular weight polyisoprene of 1.0 wt. % on monomers was used. In this run, 60 ml. of the catalyst solution was dripped in over the course of 11 minutes at a polymerization temperature between $-97°$ and $-95°$ C. to produce polymer, and 11.17 g. (22% conversion) of a tough, rubbery butyl polymer with an Mv of 110,000 and Mp of 80,000 was recovered. This higher level of polyisoprene produced even more catalyst and molecular weight poisoning. Nevertheless, even more molecular weight broadening with still more of the high molecular weight tail was achieved (estimated to be about 6%). This polymer had an Mz/Mw ratio of 2.7 by GPC using an RI detector and a ratio of 4.2 using LALLS. Even at the low conversion achieved in this run, it contained 0.8 wt. % of the low molecular weight polyisoprene incorporated mainly in the high ends tail. (The amount of incorporated polyisoprene is an estimate based on unsaturation measurements; to the extent unsaturation in the polyisoprene has been lost, the incorporation is even higher.) Clearly the low molecular weight polyisoprene is being incorporated during polymerization to broaden the molecular weight distribution by producing a high ends fraction consisting of multiple butyl chains attached to each polyisoprene molecule. This broadening is achieved without any gel formation even with slurry polymerization because the limited functionality of the low molecular weight polyisoprene will not permit the attachment of more than seven butyl chains to each polyisoprene molecule.

This examples shows that a high molecular weight fraction can be produced during polymerization through the use of a methyl chloride soluble polymer containing multiple cationically reactive unsaturation sites. The amount of the high ends fraction can be controlled by the amount of the reactive soluble polymer added; the molecular weight of the high ends fraction can be controlled by the amount and reactivity of the functionality on the reactive soluble polymer. The molecular weight of the high ends fraction can be raised by operating at high conversion to attach more butyl chains to each polyisoprene molecule and/or by raising the molecular weight of the polyisoprene so that each molecule contains more reactive unsaturation (sites). As the molecular weight is raised, the polyisoprene becomes less soluble in methyl chloride and in order to maintain it in solution it becomes necessary to introduce solubilizing groups into the polyisoprene (preferentially as a solubilizing block) or to change the diluent to make it a better solvent for polyisoprene. The latter change also has the advantage of making the diluent a better solvent for butyl and changes the nature of the slurry and in the limit results in a change from slurry polymerization to solution polymerization. Raising the molecular weight and, hence, the number of double bonds per chain of the polyisoprene too much can produce such extensive branching that gel results. Thus there is a limited range of molecular weights over which polyisoprene or polyisoprene containing solubilizing groups is useful as a functional polymer for introducing high ends branching into butyl during polymerization.

Other polydienes (i.e., polybutadiene, SBR rubbers, etc.) are also useful for introducing the high ends branched fraction but have a different useful molecular weight range depending upon the number and cationic reactivity of the double bonds. The Type IV double bonds in polyisoprene are very reactive under butyl polymerization conditions and so very low molecular weight soluble polyisoprenes are useful for introducing branching as shown in this example. The Type II double bonds in 1,4-polybutadiene are much less reactive and so a much higher molecular weight polymer are required to produce the same degree of branching in the butyl. With these less reactive polydienes, solubilizing groups are required to make the high molecular weight polymers soluble in the polymerization diluent, e.g., methyl chloride, for use during slurry polymerization of butyl rubbers as is normally practiced. Suitable lyophilic groups have a Flory-Huggins interaction parameter with the polymerization diluent of less than 0.5. Such materials include polystyrene, polyvinyl chloride, polyvinyl bromide, neoprene, mono-, di- and trisubstituted styrenes (the substitutents being halogen, such as chlorine, or lower $C_1$-$C_5$ alkyl groups, as illustrated by alpha-methyl styrene, para-t-butyl styrene, p-chlorostyrene and similar ring chlorinated styrenes).

EXAMPLE 3

A series of batch dry box runs similar to those described in the previous example was run to evaluate a styrene/butadiene block copolymer identified as KR03-K-Resin ® (Phillips Chemical Company) as a branching agent during butyl polymerization. KR03-K-Resin is a block copolymer (containing 62 mole % styrene and 38 mole % butadiene) with a viscosity average molecular weight of 145,000 by toluene solution viscosity. (Mn=98,500, Mw=213,100 by GPC). It is a diblock polymer coupled from the polybutadiene so that the polybutadiene is in the central portion of the block copolymer. The polybutadiene microstructure, which is important in determining cationic activity during butyl polymerization, is about 12% 1,2 addition and 88% 1,4 addition with mixed cis/trans configuration, but mostly cis. The dry box runs were made using a 10.9% B-3 feed using 48.5 g. isobutylene and 1.5 g. isoprene in each run. All polymerizations were run with the cooling bath temperature set at about $-66°$ C. and polymerizations were initiated by dripping in a 0.18% , solution of $AlCl_3$ in methyl chloride as catalyst.

In the control run with no branching agent added, Run 1, 13 ml. of catalyst solution was dripped in over the course of three minutes and 43.47 g. (87% conversion) of a tough, white, rubbery butyl rubber was recovered. The polymer had an Mv (dilute solution viscosity, DSV) of 245,700, an Mp of 230,000 and INOPO of 8.5 with a typical butyl molecular weight distribution. The Mz/Mw ratio by GPC was 1.5 and it is estimated that less than 0.7% was present in the high ends.

In run 2, 0.5 g. of KR03-K-Resin (1% on monomers) was dissolved in the feed blend prior to initiating polymerization. In this run, 17 ml. of the catalyst solution was dripped in over the course of eleven minutes while stirring and maintaining temperature in the reactor between $-64°$ and $-53°$ C. and 44.03 g. (87% conversion) of a tough, white, rubbery butyl rubber with a branched fraction attached to the KR03-K-Resin was recovered. This polymer had an Mv (DSV) of 274,400, an Mp of 240,000 with an INOPO of 9.0. This polymer had a branched high ends fraction of about 4.5% and an Mz/Mw ratio of 2.5 by GPC.

In run 3, 1.0 g. of KR03-K-Resin (2% on monomers) was dissolved in the feed prior to initiating polymerization. In this run, 18 ml. of the catalyst solution was dripped in over the course of ten minutes and 46.03 g. (90% conversion) of a tough, white, rubbery butyl rubber with a branched fraction attached to the KR03-KResin was recovered. This polymer had an Mv (DSV) of 298,300, an Mp of 250,000 and INOPO of 9.3. It had an Mz/Mw ratio of about 9 by GPC/LALLS with about 20% in the high ends.

These results show that KR03-K-Resin, a styrene-butadiene block copolymer, can be an effective agent to introduce controlled high ends branching into butyl rubber during polymerization if it is used at an appropriate concentration. An additional benefit of the KR03-K-Resin previously disclosed in U.S. Pat. No. 4,474,924 is that it acts as a slurry stabilizer to improve reactor operation. The slurry produced in the control run 1 agglomerated completely as made whereas stable, milky, slurries were produced in runs 2 and 3 with KR03-K-Resin added to the feed. Furthermore, under the conditions used, there was no gel in the finished polymers produced in the runs with KR03-K-Resin. Under these batch polymerization conditions, KR03-K-Resin is a desirable material for introducing a controlled high ends fraction into butyl rubber during polymerization.

EXAMPLE 4

A series of batch dry box runs similar to those of Example 3 was run using KR01-K-Resin ® as the branching instead of KR03-K-Resin. KR01-K-Resin is a styrene/butadiene block copolymer (Phillips Chemical Company) similar to KR03 but made with a different coupling agent and it has a different molecular weight. Its composition is 62 mole % styrene and 38 mole % butadiene with a viscosity average molecular weight of 140,000 by toluene solution viscosity (Mn=103,500, Mw=165,700 by GPC). Like KR03, the polybutadiene is attached to the coupling agent so that it comprises the central core of the block copolymer and the polybutadiene microstructure is similar to that of KR03. The runs were all made using a 10.9% feed containing 48.5 g. isobutylene and 1.5 g. isoprene in each batch reactor along with the desired amount of KR01-K-Resin where used. The cooling bath temperature was $-66°$ C. and an 0.18% solution of $AlCl_3$ in methyl chloride was used as the catalyst.

The control run with no branching agent was run 1 as already described in Example 3. In run 1 of this example, 0.5 g. of KR01-K-Resin (1% on monomers) was dissolved in the feed blend prior to initiating polymerization and 20 ml. of the catalyst solution was dripped in over the course of fourteen minutes while stirring and maintaining temperature between −63° and −55° C. in the reactor. In this run, 37.97 g. (76% conversion) of a tough, white, rubbery butyl rubber containing a branched high ends fraction attached to some of the KR01-K-Resin was recovered. This polymer had an Mv (DSV) of 257,100, Mp of 230,000 and INOPO of 8.7. It had an Mz/Mw ratio of 3.4 by GPC/LALLS and also produced about 8.5% high ends branching of the molecular weight distribution.

In run 2, 1 g. of the KR01-K-Resin (2% on monomers) was dissolved in the feed and 22 ml. of the catalyst solution was dripped in over the course of eight minutes while stirring and maintaining reactor temperature between −63° to −53° C. to produce 37.65 g. ( 75% conversion) of a tough, white, rubbery butyl rubber containing a branched high ends fraction attached to some of the KR01. This polymer had an Mv (DSV) of 251,700, Mp of 220,000 and an INOPO of 8.8. It had an Mz/Mw ratio of 3.9 by GPC/LALLS and about 15.5% of a high molecular weight fraction in the distribution. Adjustment of polymerization conditions can increase Mp and raise it to the preferred level of greater than about 250,000.

No gel was found in any of these polymers and like KR03, KR01 acted as a slurry stabilizer to yield stable milky slurries in runs 1 and 2 as compared to the completely agglomerated mass of rubber produced in the control run. Thus KR01 can also be a useful material for introducing a controlled high ends fraction into butyl during polymerization.

In order to show the importance of the unsaturation in the polybutadiene for producing this high ends branched fraction, run 3 was made in which the KR01 resin was partially hydrogenated to eliminate most of the active unsaturation prior to its use as a branching agent in a butyl batch dry box polymerization. This resin identified as 85% HKR01 was prepared by the use of diisobutyl aluminum hydride as a chemical reducing agent to hydrogehate and remove most of the active unsaturation in the polybutadiene portion of the KR01-K-Resin without affecting the polystyrene blocks. The hydrogenation was effected by dissolving the KR01 in dry toluene to give a 10% solution; adding the diisobutyl aluminum hydride at 1 mole per mole of butadiene and then heating to 90° C. for two hours before quenching, washing and recovering the partially hydrogenated KR01 resin. The recovered 85% HKR01 was essentially unchanged from the starting KR01 in molecular weight, but 85% of the polybutadiene unsaturation had been hydrogenated and removed. The remaining unsaturation was predominantly the more inert trans in-chain type. In the run with this partially hydrogenated KR01, 0.5 g. of the 85% HKR01 (1% on monomers) was dissolved in the feed blend and 12 ml. of the catalyst solution was dripped in over the course of ten minutes to product 31.32 g. (62% conversion) of a tough, white, rubbery butyl rubber. It has an Mv(DSV) of 2   200, Mp of 215,000 and an INOPO of 8.5 with a typic.  utyl molecular weight distribution. The Mz/Mw ratio by GPC was 1.6 with less than about 0.7% in the high ends. The viscosity average molecular weight was slightly lower than the control molecular weight of 245,700 and there was no evidence of any high ends branched fraction. The slightly reduced molecular weight probably reflects the presence of some unreacted 85% HKR01 resin in the polymer, but may also be due to slight molecular weight depression caused by the 85% HKR01 in the reactor. These results show that removing the active unsaturation in the KR01 resin by hydrogenation has rendered it effectively inert during butyl polymerization and prevented it from acting as a branching agent to produce a controlled high ends branched fraction in butyl rubber during polymerization. A lower level of hydrogenation can be used to reduce the cationic activity of the polybutadiene and achieve the desired level of residual activity to produce the desired degree of high ends branching.

In order to show the generality of partial hydrogenation for reducing effective cationic activity, a partially hydrogenated KR03 resin sample was prepared and evaluated as a branching agent in a batch dry box butyl polymerization. The KR03 resin was hydrogenated as just described for the KR01 resin and again an 85% reduction in the polybutadiene unsaturation was achieved without affecting the polystyrene blocks of the KR03 resin or its molecular weight. This 85% HKR03 resin, identified as 7887-37, was added in run 4 at 0.5 g. (1% on monomers) to a B-3 batch polymerization. In the run with the partially hydrogenated resin, 12 ml. of catalyst solution was dripped in over the course of eleven minutes to produce 31.31 g. (62% conversion) of a tough, white, rubbery butyl rubber with an Mv (DSV) of 250,200, Mp of 230,000 and an INOPO of 8.5 with a typical butyl molecular weight distribution. The Mz/Mw ratio by GPC was 1.7 with less than about 1% high ends. The molecular weight was only slightly higher than the control and there was no evidence of a high ends branched fraction. Removing most of the active unsaturation in the KR03 resin by partial hydrogenation made it quite inert during butyl polymerization and prevented it from introducing a high ends branched fraction into the polymer when added to a butyl polymerization.

The partially hydrogenated K-Resins used in these experiments were very effective slurry stabilizers and produced finer and more stable milky dispersion of the butyl rubber in methyl chloride than even the unhydrogenated K-Resins, but they were not significantly incorporated into the polymer during polymerization to produce a branched high ends fraction as were the unhydrogenated K-Resins. The hydrogenated K-Resins were absorbed on the butyl slurry particles and enhanced slurry stab:lity whereas the unhydrogenated K-Resins became chemically attached to the butyl polymer during polymerization and produced a branched high ends fraction. The GPC test and Mz/Mw ratios already cited are evidence of this difference. Extraction experiments provide further proof of this difference. The extraction experiments were performed by recovering the butyl rubber from the batch experiment in methyl/ethyl ketone which is a non-solvent for butyl but a solvent for K-Resins or hydrogenated K-Resins. Two MEK extractions are preformed and the extracts combined to recover the MEK soluble resin and the MEK insoluble rubber separately. In runs with the hydrogenated resins, nearly all of the K-Resins can be extracted and recovered in unchanged form. With the unhydrogenated K-Resins, very little of the resin can be extracted, and the extracted material has butyl attached to it. These extraction experiments provide further proof that the unsaturation in the polybutadiene portion of the K-Resins is active during butyl polymerization so that butyl chains become attached to it to produce a high ends branched fraction. Hydrogenation of the unsaturation reduces this reactivity and reduces the effectiveness of the K-Resins as branching agents.

EXAMPLE 5

A series of butyl polymerization runs were made in a butyl continuous polymerization reactor with various amounts and types of K-Resins. The reactor permitted polymerization experiments to be run under continuous polymerization conditions which closely simulated commercial polymerization conditions. The rector was a modified, baffled, draft tube containing well stirred tank type reactor of nominal one-gallon capacity and containing 2.86 square feet of heat transfer surface to remove the heat of polymerization and maintain the rector contents at polymerization temperature. Separate feed and catalyst streams could be chilled and metered continuously into the reactor and the effluent continuously overflowed through a 3/4-inch overflow line into chilled product slurry receivers for quenching and recovery. Reactor temperature was maintained and controlled by circulating a heat transfer fluid at a controlled rate and temperature through channels within the reactor heat transfer surfaces.

The equipment is designed to meter and chill four separate streams into the reactor to establish a steady-state set of polymerization conditions. Normally a monomer feed, an additive solution (i.e., K-Resin solution), a diluent stream, and a catalyst solution were fed into the reactor to establish the steady state. In a control polymerization with no K-Resin, run 1, a steady state was achieved with the following feeds into the reactor, all in grams per minute:

| | |
|---|---|
| Isobutylene | 50.403 |
| Isoprene | 1.375 |
| Methyl Chloride | 135.465 |
| $AlCl_3$ | 0.047 |
| | 187.29 |

Reactor temperature was controlled at $-96.0°$ C. and at the steady-state, monomer conversion was 94.5% with production of a 26.1% slurry. The reactor effluent was rather thick and lumpy and reactor fouling forced termination of the run after five hours. The butyl rubber produced at steady state had an INOPO of 10.7 with an $Mv=528,500$ and $Mp=500,000$. It had a typical butyl molecular weight distribution with an Mz/Mw ratio by GPC of 1.6 with less than 0.7% high ends.

In another control polymerization with no K-Resin, run 2, a steady state was achieved with the following feeds into the reaction, again, all in grams per minute:

| | |
|---|---|
| Isobutylene | 53.590 |
| Isoprene | 1.461 |
| Methyl Chloride | 123.388 |
| $AlCl_3$ | 0.030 |
| | 178.47 |

Reactor temperature was controlled at $-94.3°$ C. and at the steady-state, monomer conversion was 85.3% with production of a 26.3% slurry. The reactor efflucent was thick and lumpy and reactor fouling forced termination of the run after 4½ hours. The butyl rubber produced at the steady state had an INOPO of 11.3 and an $Mv=698,300$ and $Mp=660,000$. It had a typical butyl molecular weight distribution with an $Mz/Mw=1.7$ by GPC and less than 0.7% high ends.

In a run to produce butyl containing a branched high ends mode, run 3, KR01-K-Resin was dissolved in methyl chloride to yield a 2.51% solution of the resin as one of the feeds to the reactor and a steady-state was established with the following feeds into the reactor:

| | |
|---|---|
| Isobutylene | 52.38 |
| Isoprene | 1.41 |
| Methyl Chloride | 109.85 |
| KR01-K-Resin | 0.40 |
| $AlCl_3$ | 0.048 |
| | 164.09 |

Reactor temperature was controlled at $-93.5°$ C. and at the steady-state monomer conversion was 94.8% with production of a 31.3% slurry. The reactor effluent was a homogeneous fluid slurry and the reactor ran well with no evidence of fouling until the run was voluntarily terminated. The butyl rubber produced at the steady-state had an INOPO of 16.1 with an $Mv=649,350$ and $Mp=600,000$. The high INOPO reflects the presence in the butyl of KR01-K-Resin which was attached to the butyl to yield a high ends branched fraction. None of the KR01-K-Resin was extractable from the butyl using MEK, a good solvent for KR01-K-Resin. The KR01-K-Resin level in the reactor was 0.75% on monomers or about 0.79% on polymer. GPC/LALLS analyses showed this polymer to have a long high molecular weight tail in the distribution. It had an Mz/Mw ratio of 3.9 and contained no detectable amount of gel. Under these continuous polymerization conditions, KR01-K-Resin introduced a branched high ends fraction of about 8.5% into butyl without producing gel while at the same time acting as a slurry stabilizer to improve reactor operation by allowing operation at a high slurry concentration without fouling.

In another run to produce butyl containing a branched high ends mode using KR01 as the branching agent, run 4, a steady-state was established with the following feeds into the reactor:

| | |
|---|---|
| Isobutylene | 54.235 |
| Isoprene | 1.464 |
| Methyl Chloride | 87.191 |
| KR01-K-Resin | 1.014 |
| $AlCl_3$ | 0.061 |
| | 143.97 |

Reactor temperature was at $-92.0°$ C. At the steady-state, monomer conversion was about 99.5% with production of a 39.2% slurry. The reactor effluent was a very thick homogenous slurry and the reactor was barely operable with $-92°$ C. being the lowest polymerization temperature which could be maintained. The reactor only ran a few hours before temperature control became impossible and more diluent had to be added to dilute the slurry. The butyl rubber produced during this steadystate had an INOPO of 17.3 with an $Mv=433,350$ and $Mp=380,000$. This high INOPO for a feed with a B number of 2.70 is due to the KR01 resin having become incorporated into the butyl to produce a branched high ends fraction during polymerization. None of the KR01 was extractable from the butyl using MEK as the extracting solvent. The KR01 level in the reactor was 1.82% on monomers or about 1.81% on polymer. The polymer apparently contained some very tenuous gel which was present in samples taken directly from the reactor effluent and vacuum oven dried but was absent in the final recovered polymer which was kneaded in isopropyl alcohol to effect deashing and was then hot mill dried. GPC analyses of the hot mill dried polymer showed the molecular weight distribution to be bimodal with about 5.5% of the polymer present as a branched high molecular weight mode with a molecular weight greater than 2.5 million. This polymer had an Mz/Mw ratio of 4.5 with no measurable amounts of gel in the hot mill dried material. Under these polymerization conditions, KR01 resin effectively introduced a branched high ends mode into butyl without producing objectionable gel while at the same time improving reactor operation by acting as a slurry stabilizer.

In still another run to produce a butyl containing a branched high ends mode, run 5, KR03-K-Resin was dissolved in methyl chloride to yield a 1.67% solution of the resin as one of the feeds to the pilot plant reactor and a steady-state was established with the following feeds into the reactor:

| Isobutylene | 55.27 |
|---|---|
| Isoprene | 1.53 |
| Methyl Chloride | 99.51 |
| KRO3-K-Resin | 0.73 |
| AlCl₃ | 0.045 |
| | 157.09 |

Reactor temperature was controlled at −95° C. and at steady-state conversion was 93% with production of 34.1% slurry. The reactor effluent was a homogeneous fluid slurry, but gel was being made. Within a few hours, the run had to be terminated as the reactor was badly fouled with gel. It could not be cleaned in the normal manner by warming and solvent washing because the fouling polymer was an insoluble gel. The reactor had to be disassembled and manually cleaned before it could be used again. The butyl polymer produced during this steady-state condition contained more than 50% gel and so could not be characterized well; it contained no extractable KR03. The KR03 level in the reactor for this run was 1.3% on monomers. It is clear that at that level and under the polymerization conditions of this example, the KR03 was too reactive; it caused more branching than desirable and resulted in formation of a significant amount of gel. It should be noted that under the batch polymerization conditions of Example 2, 2% KR03 on monomers did not result in gel whereas under the continuous polymerization conditions of this example, 1.3% KR03 on monomers produced a highly gelled polymer. It has been found that under high conversion continuous polymerization conditions, gel formation is more of a problem than under low conversion batch polymerization conditions and gel formation is always more of a problem when producing higher molecular weight polymers. It is thus necessary to adjust the level and/or activity of the branching agent to suit the polymerization conditions under which it is used in order to produce the desired amount of high ends branching without producing undesirable amounts of gel.

In another run using KR03-K-Resin as the branching agent, run 6, the KR03 was partially hydrogenated prior to use in order to reduce its activity and avoid gel formation. Partial hydrogenation was effected using diisobutyl aluminum hydride as the reducing agent as already described in Example 4. For this run, 50% of the unsaturation in the polybutadiene blocks of the KR03 resin was removed by hydrogenation. The polystyrene blocks were not affected and the resin molecular weight also remained unchanged. The 50% chemically hydrogenated KR03 was dissolved in methyl chloride to form a 2.06% solution of the partially hydrogenated run as one of the feeds to the pilot plant reactor and a steady state was established with the following feeds into the reactor:

| Isobutylene | 52.53 |
|---|---|
| Isoprene | 1.43 |
| Methyl Chloride | 92.58 |
| 50% Chemically Hydrogenated KRO3 | 0.54 |
| AlCl₃ | 0.046 |
| | 147.13 |

Reactor temperature was controlled at −95° C. and the steady-state conversion was about 99% with production of a 36.7% slurry. The reactor effluent was a homogeneous, fluid, stable slurry and the reactor ran well with no evidence of fouling until the run was terminated voluntarily. The butyl rubber produced during steady state had an INOPO of 24 with an Mv=200,000 and Mp=160,000. The high INOPO reflects the presence of chemically bonded KR03 resin in the butyl. The KR03 level in the reactor was 1% on monomers and it was all chemically bonded to the butyl; none could be extracted from the recovered rubber. GPC/LALLS analyses on this polymer showed the presence of about 11% of a high molecular weight tail which was rich in the KR03 branched butyl. The polymer had an Mz/Mw ratio of 4.5. Under these polymerization conditions, the 50% hydrogenated KR03 resin introduced a branched high ends fraction into butyl without producing objectionable gel, while at the same time improving reactor operation by acting as a slurry stabilizer. However, viscosity average and peak molecular weights were reduced.

It is possible to remove so much of the unsaturation in the polybutadiene blocks of K-Resins that they become completely ineffective as branching agents. A KR01-K-Resin sample was chemically hydrogenated using diisobutyl aluminum hydride as in Example 4 to remove 85% of the polybutadiene unsaturation. This resin identified as 85% HKR01 was dissolved in methyl chloride to yield a 1.90% wt. % solution of the 85% HKR01 in methyl chloride as one of the feeds to the reactor. In run 7, a steady-state was achieved with the following feeds into the reactor:

| Isobutylene | 52.30 |
|---|---|
| Isoprene | 1.42 |
| Methyl Chloride | 89.60 |
| 85% HKRO1 | 0.44 |
| AlCl₃ | 0.034 |
| | 143.80 |

Reactor temperature was controlled at −95° C. and at the steady-state monomer conversion was 98.0% with production of a 36.9% slurry. The reactor effluent was a very fluid homogeneous slurry and the reactor ran well with no evidence of fouling until the run was voluntarily terminated. The butyl rubber being produced at the steady-state had an INOPO of 10.6 with an Mv=302,000 and Mp=280,000. This butyl had a nearly normal INOPO for a feed with a B number=2.7 and essentially all of the 85% HKR01 resin was extractable by our MEK extraction procedure; essentially none of the resin had become bonded to the butyl during polymerization. GPC analyses showed this butyl to have a typical molecular weight distribution with an Mz/Mw ratio of 1.7 (based on GPC/LALLS) and less than 1% high ends. This result shows that removal of most of the active unsaturation in the KR01 resin had rendered it quite inert during continuous butyl polymerization conditions (just as it did under the batch polymerization conditions of Example 4) and prevented it from acting as a branching agent to produce a controlled high ends fraction in butyl during polymerization. The 85% HKR01 was still very effective as a slurry stabilizer to improve reactor operation, but it functions by adsorption on the butyl particles rather than by chemical attachment during polymerization.

The continuous butyl polymerization experiments show that styrene-butadiene-styrene block copolymer resins can be used to introduce a controlled high ends fraction into butyl during polymerization under conditions simulating commercial production. The branching activity of the styrene-butadiene-styrene block copolymer resins can be adjusted as desired by partial hydrogenation of the polybutadiene block so that the desired degree of branching can be achieved without excessive gel formation. Selection of the resin, the degree of hydrogenation, and the amount employed during polymerization enable considerable control to be exercised over the amount and nature of the high ends fraction introduced into butyl during polymerization. Styrenebutadiene block copolymers combine the desirable attributes of producing high ends branching while at the same time acting as slurry stabilizers to improve reactor operation and reduce the extent and rate of reactor fouling. It is thus possible to produce the desired high ends fraction under practical conditions by eliminating fouling of the reactor with insoluble gel. The slurry stabilization effectiveness of the block copolymers is enhanced by hydrogenation so activity in branching can be adjusted by partial hydrogenation without impairing their effectiveness at improving reactor operation.

While the continuous polymerization experiments utilized several styrene-butadiene-styrene block copolymer resins, other branching agents and slurry stabilizers can be employed to accomplish the same end while still employing partial hydrogenation to adjust branching activity to the desired level. As discussed earlier, it is most preferable to combine the function of branching agent and slurry stabilizer in one species by utilizing a block copolymer comprising a lyophilic or methyl chloride soluble block (e.g., polystyrene, polyvinylchloride) and a block containing multiple reactive unsaturation (e.g., a polydiene block) to produce the desired high ends branched fraction during polymerization. Suitable block copolymers include: styrene/butadiene, styrene/isoprene, styrene/piperylene, etc. The preferred block architecture is a star block with the lyophile block on the periphery. It is also possible, though less preferable, to use separate species to accomplish the function of branching as already discussed with or without additional reagents for slurry stabilization.

EXAMPLE 6

In order to more fully demonstrate the advantages of the improved butyls with controlled high ends branched fraction of this invention, a more complete evaluation of several polymers prepared in the continuous polymerization unit was undertaken in comparison with commercial grades of butyl rubber. Also included in the comparison is a butyl composition prepared by blending. The improved butyls with controlled high ends branched fraction selected for evaluation were prepared in the continuous polymerization unit in runs similar to those described in Example 5 using KR01-K-Resin as the branching agent and slurry stabilizer.

The high ends branched butyl polymer designated R49-C12 was prepared with the following feeds into the reactor:

| Isobutylene | 35.122 |
|---|---|
| Isoprene | 0.878 |
| Methyl Chloride | 114.822 |
| KR01-K-Resin | 0.612 |
| AlCl$_3$ | 0.050 |
| | 151.5 |

Reactor temperature was controlled at −94.2° C. and at the steady-state monomer conversion was 89.7% with production of a 21.7% slurry. The KR01 level was 1.7 wt. % on monomers or 1.9 wt. % on polymer and none was extractable from the recovered butyl. The reactor ran well and the butyl produced was gel free after hot milling and contained approximately 20.5% branched high ends mode which was rich in the K-Resin as determined by GPC.

Both the Refractive Index (RI) and Ultraviolet (UV) traces showed bimodality in the molecular weight distribution with the UV trace confirming the high concentration of the K-Resin in the high molecular weight branched mode. The Mz/Mw ratio by GPC (LALLS) was 5.6. Other characterizations and evaluations on this polymer are given later in this example.

The high ends branched butyl polymer designated R4-C9 was prepared with the following feeds into the reactor:

| Isobutylene | 48.44 |
|---|---|
| Isoprene | 1.46 |
| Methyl Chloride | 121.24 |
| KR01-K-Resin | 0.409 |
| AlCl$_3$ | 0.053 |
| | 171.6 |

Reactor temperature was controlled at −93° C. and at steady-state monomer conversion was 91.0% with production of a 26.7% slurry. The KR01 level was 0.82 wt. % on monomers or 0.90 wt. % on polymer and none was extractable from the recovered butyl which was gel free after hot milling and contained about 12.5% branched high ends mode rich in K-Resin as determined by GPC.

For this polymer the high ends branched mode appeared as a bump in the RI trace because the peak molecular weight of the lower mode was relatively high and both modes were fairly broad so that they overlapped considerably and were not resolved. However, the high molecular weight branched mode which is rich in K-Resin was again clearly evident in the UV trace. The Mz/Mw ratio of this polymer by GPC (LALLS) was 9.0. Other characterizations and evaluations are given later in this example.

The commercial polymers included as controls in the evaluation were Butyl 365 and Butyl 268 (described previously). Also included in the evaluation was a blend polymer prepared by solution blending of Butyl 365, high molecular weight polyisobutylene (Vistanex L140), and a lower molecular weight higher unsaturation butyl with an Mv=200,000 prepared in the continuous polymerization unit. GPC analyses of all of these polymers are summarized in the following table (molecular weight values×10$^{-3}$):

| Sample | LALLS | | RI | | | 4 Mp, High Ends, |
|---|---|---|---|---|---|---|
| | Mw | Mz/Mw | Mw | Mp | Mp(a) | wt. % |
| Butyl 268 | 521 | 1.7 | 507 | 500 | (b) | 0.7 |
| Butyl 365 | 375 | 1.8 | 406 | 308 | (b) | 2.0 |
| Blend B (Ex. 1) | 547 | 2.6 | 498 | 310 | (b) | 9.0 |
| R49C12 | 1530 | 5.6 | 476 | 292 | 1500 | 20 |
| R4C9 | 1580 | 9.0 | 454 | 350 | 1400 | 12 |

(a) = UV measurement
(b) = same as peak using RI

Figure 2:
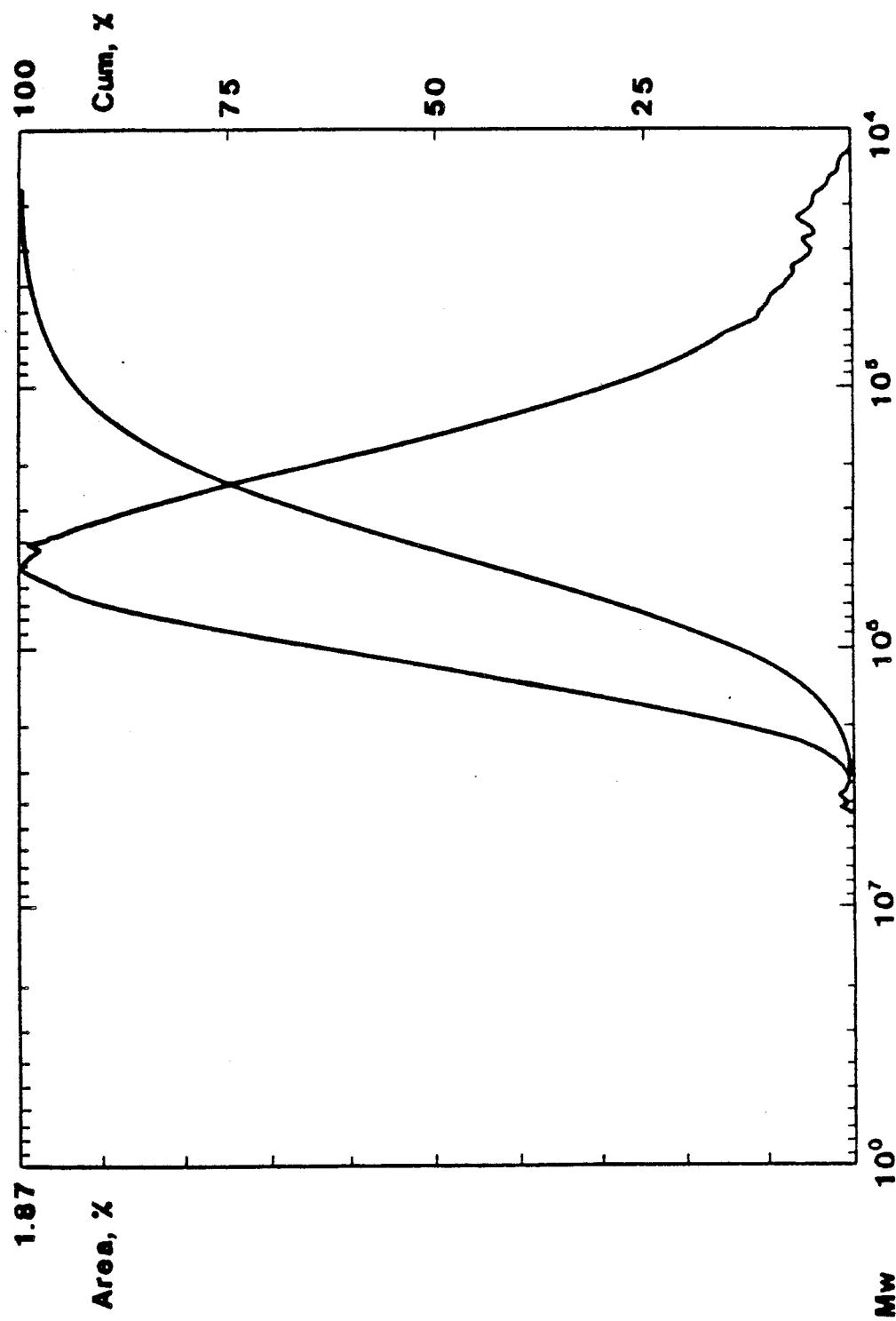
Figure 3:
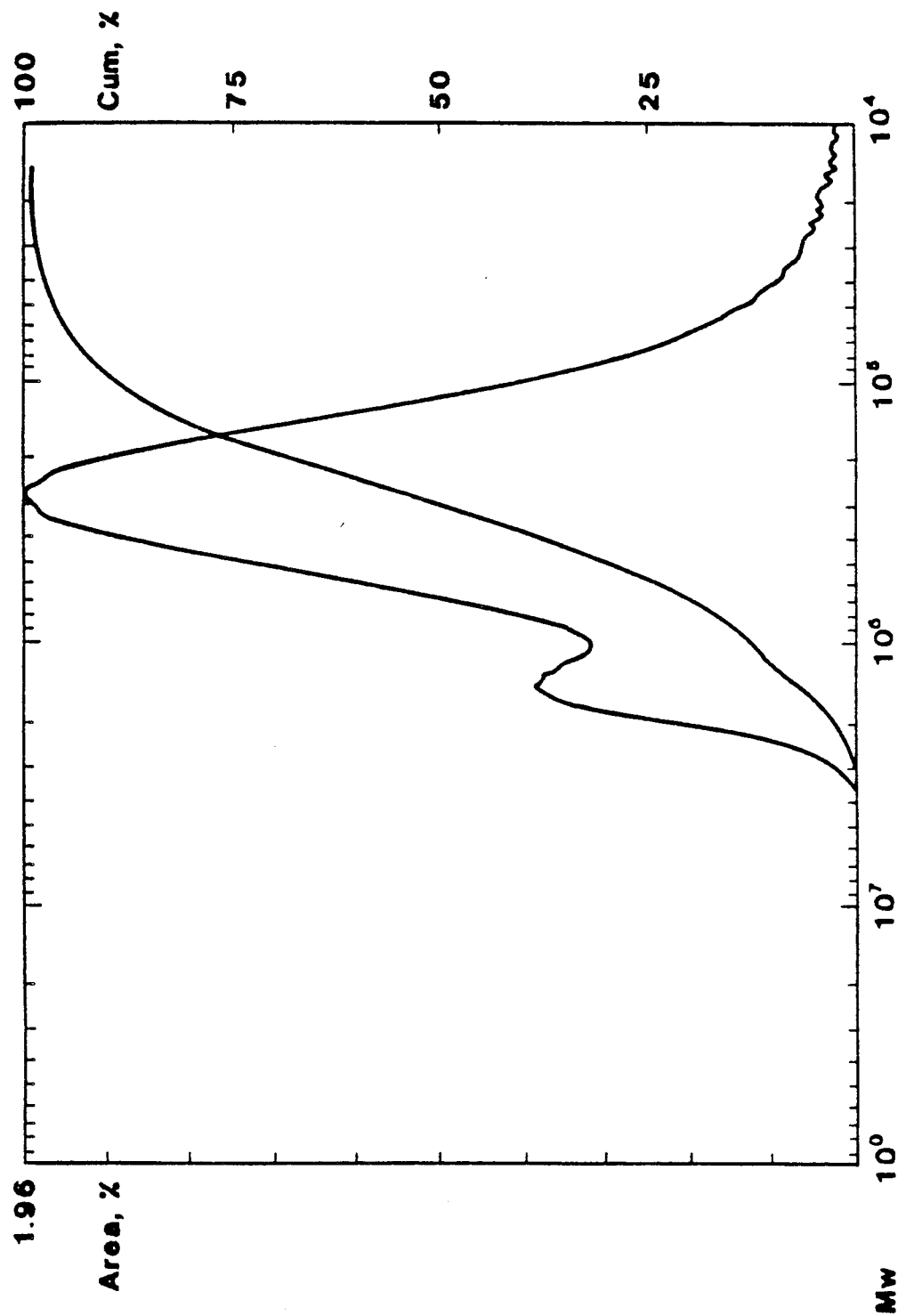
Figure 4:
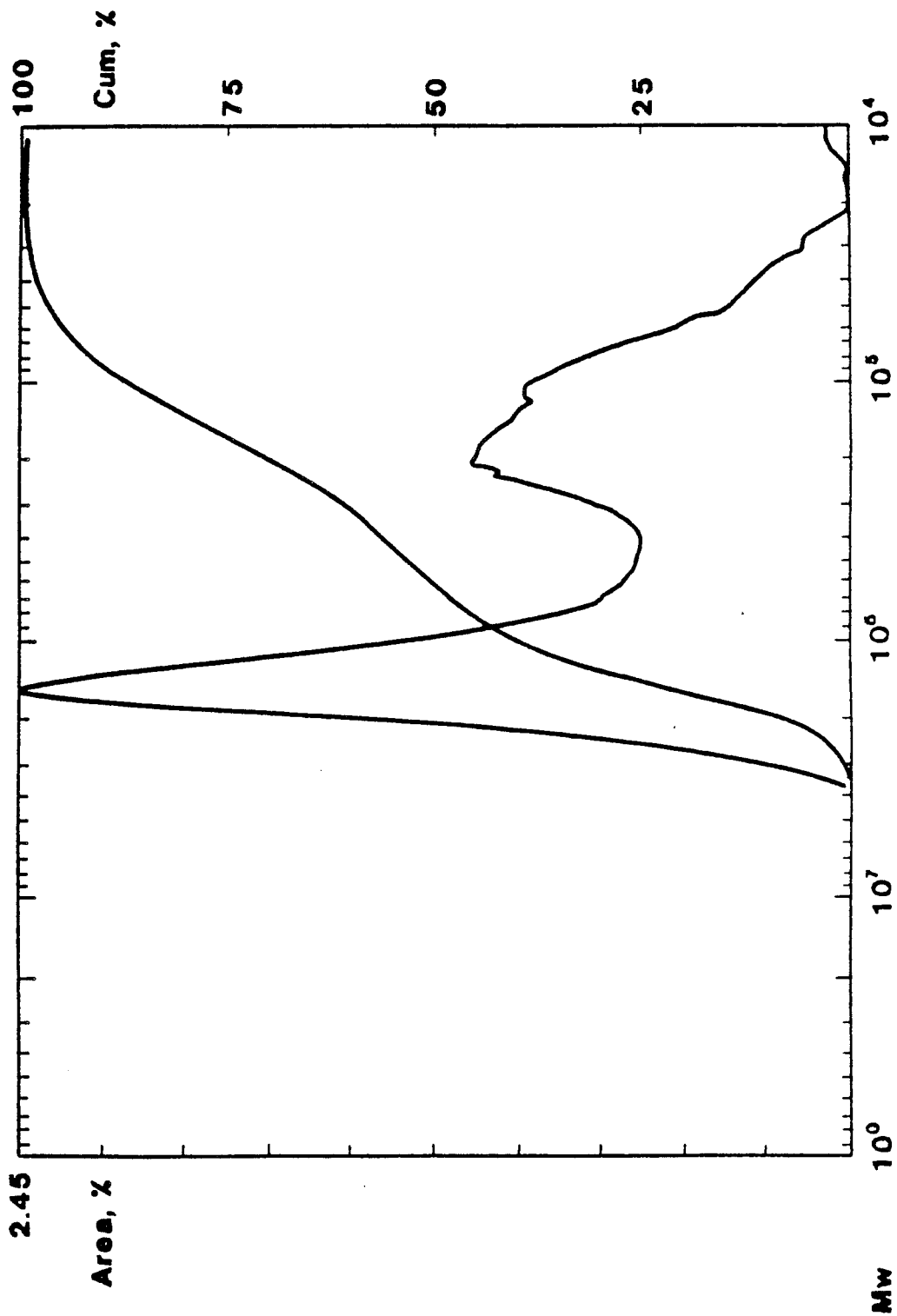

The model blend has a higher Mz/Mw than the reference commercial samples, but not nearly so high as is achieved with the controlled high ends branching produced by KR01-K-Resin; there are limitations in blending linear components. The two polymers R49C12 and R4C9 each had a clearly resolved branched high ends mode with a very high Mp for the high ends mode. FIGS. 2 and 3 contrast a GPC chromatogram (RI) for a typical Butyl 268 polymer and a polymer such as R49C12 which contains a branched high ends mode. The strong U.V. absorption peak by the polystyrene lyophile indicates incorporation of the branching agent in the high molecular weight end as indicated in the table (FIG. 4 illustrates such a U.V. trace).

The Mooney viscosity, green strength, and stress-relaxation measurements on the polymers of this example are summarized (for neat polymer) in the following table:

| | Mooney (ML 1 + 8 at 125° C.) | Tensile Green Strength (psi) | 4-Minute Relaxed Stress (psi) |
|---|---|---|---|
| Exxon Butyl 268 | 50 | 33.8 | 11.8 |
| Exxon Butyl 365 | 33 | 28.1 | 7.3 |
| Blend | 37 | 32.1 | 9.7 |
| R49C12 | 42 | 33.1 | 9.5 |
| R4C9 | 50 | 35.1 | 11.1 |

The higher molecular weight Butyl 268 has higher green strength, but at the expense of longer relaxation time as shown by the higher relaxed stress after 4-minutes relaxation time. The green strength of Butyl 268 is adequate for most purposes, but it would be highly desirable to achieve this at the lower Mooney viscosity and higher stress-relaxation rate of Butyl 365. The blend is an improvement in that direction--it achieves a higher green strength than Butyl 365 and improved relaxation stress compared to Butyl 268. The high ends branched polymer R49C12 shows a higher green strength and faster stress-relaxation time than the blend; while R4C9 shows a much higher green strength than even Butyl 268 at a lower relaxed stress.

The polymers of this example were each compounded in a typical butyl rubber innertube formulation for further evaluation. The formulation used is shown below (parts by weight):

| Polymer | 100 |
|---|---|
| GPF Carbon Black (Grade N660) | 70 |
| Paraffinic rubber process oil$^{(a)}$ | 25 |
| Stearic Acid | 1 |

$^{(a)}$Grade Flexon 845 (Exxon Chemical Company)

The formulations were prepared using a conventional laboratory internal mixer (Banbury ®) and mix cycle. Mooney viscosity, green strength, and stress-relaxation measurements on the compounded polymers are summarized in the following table.

| | Polymer Mooney (ML 1 + 8 at 125° C.) | Compound Mooney (ML 1 + 4 at 100° C.) | Tensile Green Strength (psi) | 4-Minute Relaxed Stress (psi) |
|---|---|---|---|---|
| Butyl 268 | 50 | 38.5 | 24.8 | 3.54 |
| Butyl 365 | 33 | 30 | 19.8 | 1.88 |
| Blend B (Ex. 1) | 37 | 34.5 | 24.1 | 2.64 |
| R49C12 | 42 | 30 | 25.6 | 1.63 |
| R4C9 | 50 | 39 | 28.3 | 3.30 |

Results are similar to the neat polymer results, and the advantages of the controlled high ends branched polymers are evident. The commercial butyl polymers show the expected results with the model blend being a step toward achieving a better balance of properties. The controlled high ends branched polymers significantly altered the balance of properties. In this innertube formulation, R4C9 had much higher green strength than Butyl 268 and a lower relaxed stress. R49C12 had a compounded Mooney viscosity equivalent to Butyl 365 with a green strength better than Butyl 268 and a relaxed stress lower than Butyl 365; a particularly desirable combination of properties.

To complete the evaluation, vulcanizate properties were measured on the innertube formulations with the following results:

| | Vulcanizate Properties (Innertube Formulation$^{(a)}$ | | | | | | | |
|---|---|---|---|---|---|---|---|---|
| | Monsanto Rheometer$^{(b)}$ | | | Stress-Strain Properties$^{(c)}$ | | | | |
| | | | | 100% | 300% | Tensile | | Hard- |
| | Delta Torque | TS2 (Min) | TC90 (Min) | MOD (MPa) | MOD (MPa) | Strength (MPa) | Elong. (%) | ness (Shore A) |
| Butyl 268 | 39.8 | 5.6 | 26.8 | 1.5 | 5.4 | 11.3 | 590 | 54 |
| Butyl 365 | 49.8 | 4.5 | 26.1 | 2.2 | 6.9 | 10.0 | 430 | 58 |
| Blend B | 34.0 | 5.4 | 28.3 | 1.8 | 5.9 | 10.6 | 560 | 58 |
| R49C12 | 45.4 | 5.0 | 26.8 | 2.1 | 7.9 | 11.4 | 440 | 64 |

-continued

Vulcanizate Properties (Innertube Formulation[a])

| | Monsanto Rheometer[b] | | | Stress-Strain Properties[c] | | | | |
|---|---|---|---|---|---|---|---|---|
| | Delta Torque | TS2 (Min) | TC90 (Min) | 100% MOD (MPa) | 300% MOD (MPa) | Tensile Strength (MPa) | Elong. (%) | Hardness (Shore A) |
| R4C9 | 49.5 | 4.5 | 26.3 | 2.3 | 7.7 | 11.1 | 430 | 60 |

[a]Cure system (parts by weight): Zinc oxide - 5, Sulfur - 2.0, mercaptobenzothiazole - 0.5, tetramethyl thiuram disulfide - 1.5
[b]3° Arc, 1.7 Hz, 160° C. Delta torque = change in torque from minimum to maximum; TS2 = time to 2 unit rise above minimum; TC90 = optimum cure time (90% of delta torque)
[c]Samples cured 30 minutes at 150° C.

The controlled high ends branched polymers yielded a high cure state as shown by high delta Torque in the Monsanto Rheometer and high modulus along with good tensile strength and elongation. Blend B had a lower cure state as indicated by the low delta Torque in the rheometer due to the unvulcanizable polyisobutylene component (Vistanex L140), which makes up the higher molecular weight species in this blend.

EXAMPLE 7

A multifunctional lyophile-containing reagent was prepared by hydrochlorination of a styrene-isoprene-styrene triblock polymer containing a very short central polyisoprene block. The triblock polymer was polymerized anionically using sec-BuLi as the catalyst in cyclohexane with 10% THF. Monomer was added sequentially (styrene, isoprene, and then styrene again) to form the triblock. The central polyisoprene block comprised 5.78 wt. % of the triblock polymer. It was functionalized by addition of HCl to the central isoprene block in methylene chloride solution at 0° C. The functionalized polymer contained 0.6 wt. % chlorine attached to the short central polyisoprene block; total Mn of the the triblock polymer was about 200,000. The functionalized triblock polymer was readily soluble in methyl chloride because of its high polystyrene content and essentially constituted a lyophile highly functionalized in the center by virtue of the chlorine atoms on the short central polyisoprene block. Each triblock chain contained greater than 25 active chlorine atoms to serve as sites for attaching butyl chains during polymerization to form the high ends mode. Because of the anionic polymerization conditions used (10% THF present), the isoprene was largely incorporated in the 3,4 mode in the central polyisoprene block and the HCl adduct contained mostly pendant tertiary chlorine atoms which are highly active during cationic butyl polymerization conditions. The structure of the active tertiary chlorine functionality is shown below:

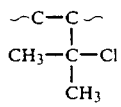

Under cationic butyl polymerization conditions the tertiary chlorine is removed to form a tertiary carbenium ion which initiates a butyl chain so that the butyl chain is attached to the functionalized lyophile at the site where the tertiary chlorine atom was removed. The multifunctional lyophile of this example is identified as 9851-39-D.

This reagent was used in a batch dry box polymerization to produce a butyl rubber containing a high ends mode.

A 500 ml reaction flask fitted with a thermometer, stirrer, and dropping funnel was set up in a glove box having an oxygen and moisture-free nitrogen atmosphere and the flask was cooled to −65° C. by immersion in a controlled temperature liquid-nitrogen-cooled heat transfer bath. The reactor was charged with 409.75 g. purified dry methyl chloride and then 0.25 g. 9851-39-D was added as a dry powder and stirred in. It dissolved quickly to give a clear solution. Then 48.5 g. purified, dried, and distilled polymerization grade isobutylene and 1.5 g. purified, dried and distilled polymerization grade isoprene and were added and stirred in to give a feed batch blend containing 10.9% of a B-3 feed with 0.5% 9851-39-D on monomers. Nine ml. of a catalyst solution consisting of 0.3 wt. % ethyl aluminum dichloride in methyl chloride was dripped in slowly over the course of 8 minutes while stirring and maintaining temperature by immersion of the reactor in the heat transfer bath. The reactor was then quenched by addition of cold methyl isobutyl ketone, MIBK (25 ml.) and transferred to the hood where it was allowed to stir and warm slowly with additional MIBK being added as the methyl chloride and unreacted monomers flashed off to yield a fine dispersion of polymer in MIBK at room temperature. The polymer was recovered by settling and decanting off the MIBK and then reslurrying in fresh MIBK and settling and decanting again to try to extract any unreacted functional lyophile from the butyl polymer. The extracted butyl was kneaded and washed in isopropanol to remove catalyst residues and then vacuum oven dried at 80° C. with 0.2 wt. % BHT mixed into it as an antioxidant. The MIBK extracts were combined and allowed to evaporate to concentrate and then precipitated in methanol; however, essentially no polymer was present in the MIBK extracts, all the 9851-39-D had become incorporated into the butyl during polymerization and was recovered with the butyl. Thirty-five and a half grams of white, tough, rubbery butyl rubber were recovered. Conversion was 80% with a catalyst efficiency of 1500 g/g. The recovered polymer had a viscosity average molecular weight of 230,000 with an INOPO of 8.

GPC analysis using RI and UV detectors showed the polymer to be bimodal with essentially all of the polystyrene lyophile in the high molecular weight mode as shown by the UV detector. The main polymer mode had a peak molecular weight of 140,000 and a normal breadth for batch butyl polymerization, but a second high molecular weight mode with a peak molecular weight of greater than 3 million (uncorrected) containing all of the polystyrene with many butyl arms attached was also present. Use of the multifunctional lyophile permitted the formation of a high molecular weight mode during polymerization. A large number of the butyl chains formed during polymerization were attached to each multifunctional lyophile molecule to form the high ends mode. Although only 0.5% of the functional polystyrene based on monomers was added to the polymerization, approximately 11% of the butyl became incorporated into the high ends mode because so many (i.e., approx. 25) butyl chain s became attached to each multifunctional polystyrene. The amount of the high ends mode can readily be varied by varying the amount of the multifunctional lyophile added to the polymerization; the molecular weight of the high ends mode is readily controlled by varying the functionality of the multifunctional lyophile and thus the number of butyl chains formed during polymerization which become linked together by virtue of being attached to the same lyophile molecule. This approach then affords a practical way of controlling both the molecular weight and amount of the high ends mode produced. Other molecular weight characteristics of the modified polymer were: Mn 99,000; Mw=550,000; Mw/Mn=5.55; Mz/Mw (LALLS)=greater than 9.

EXAMPLE 8

A multifunctional lyophile-containing reagent was prepared by hydrochlorination of a styrene-isoprene-styrene triblock polymer containing a short central polyisoprene block. In this example, the lyophile was prepared by "living" anionic polymerization of styrene in cyclohexane at 60° C. with sec-BuLi catalyst; after completion of the styrene polymerization a small amount of isoprene was added as a capping agent and then the capped polymer was coupled with ethyl benzoate to give triblock polymer with a very short central polyisoprene block. The coupled triblock polymer had a molecular weight of 170,000 with an INOPO of 5.6 and contained about 1.3 wt. % isoprene as a central block attached to the coupling agent. It was functionalized by addition of HCl in methylene chloride at approximately 3° C. The functionalized polymer contained 0.39 wt. % chlorine mostly present as the tertiary chloride, as in Example 7. The functionalized lyophile contained about 20 active chlorine atoms per chain, again clustered in the short central polyisoprene portion. This polyfunctional lyophile was identified as 10564-48-6. It was used in a batch dry box polymerization to produce a butyl rubber containing a high ends mode.

A batch butyl polymerization was conducted as in Example 7 except that 0.25 g. 10564-48-6 was dissolved in the methyl chloride as the polyfunctional lyophile instead of 9851-39-D. In this batch run, 7-1/4 ml. of 0.3% EADC in methyl chloride catalyst was dripped in over the course of 10 minutes while maintaining reactor temperature between −64° and −62° C. 11.7 g. of tough, rubbery butyl rubber were recovered as in Example 7. The rubber had a viscosity, average molecular weight of 286,000 and an INOPO of 9.1. GPC analysis showed this polymer was also bimodal containing a high ends mode consisting of many butyl chains attached to the polyfunctional lyophile. In this example the main mode had a peak molecular weight of 1 .000, and the high ends mode a peak (uncorrected) of greater than 4.5 million. Again, the polyfunctional lyophile permitted production during polymerization of a butyl rubber containing a high ends mode. The amount and molecular weight of this high ends mode is controllable by varying the amount and functionality of the polyfunctional lyophile. Other molecular weight characteristics of the modified polymer were: Mn=160,000; Mw=810,000; Mw/Mn=5.08; Mz/Mw (LALLS)=greater than 9; estimated fraction of polymer in high molecular weight fraction=21%.

EXAMPLE 9

Several multifunctional lyophile-containing reagents were prepared by hydrochlorination of a series of random styrene/isoprene copolymers prepared by radical polymerization of styrene/isoprene feeds in toluene using azo-bis-isobutyronitrile (AZBN) initiator at 80° C. These multifunctional lyophiles were used in batch polymerization as in Example 7 to prepare butyl rubbers containing a high ends mode. The amount and molecular weight of the high ends mode was controllable by varying the amount and functionality of the multifunctional lyophile; Tables 9-1 and 9-2 below summarize the experimental results. It can be seen that useful polymers can be produced and that gel can result if an excessive amount of cationically active functionality is present in the branching agent.

TABLE 9-1

| | HCSI Branching Agent[a] | | | |
|---|---|---|---|---|
| Run | Isoprene[b] | Chlorine[b] | Mv[c] | Cl/Chain[d] |
| 1 | 0.32 | 0.14 | 125 | 20 |
| 2 | 0.32 | 0.14 | 125 | 20 |
| 3 | 0.52 | 0.24 | 85 | 25 |
| 4 | 0.66 | 0.33 | 60 | 25 |
| 5 | 0.66 | 0.33 | 60 | 25 |
| 6 | 1.0 | 0.93 | 135 | 150 |

[a]Hydrochlorinated styrene/isoprene radical copolymer.
[b]Weight %.
[c]Values shown are × $10^{-3}$.
[d]Approximate number of chlorine atoms per chain.

TABLE 9-2

| | Polymerizations Using HCSI Branching Agent | | | |
|---|---|---|---|---|
| Run | Agent[a] Conc | MP[b] | Mz/Mw[c] | High Ends Fraction[d] |
| 1 | 0.5 | 280 | 3.5 | 8.0 |
| 2 | 1.0 | 250 | 4.9 | 15.5 |
| 3 | 0.75 | 300 | 3.5 | 12.5 |
| 4 | 0.5 | 320 | 3.5 | 8.5 |
| 5 | 1.0 | 150 | 6.0 | 16.5 |
| 6 | 1.0 | GEL - NO GPC RESULTS | | |

[a]Weight percent based on monomers
[b]Values shown are × $10^{-3}$
[c]Using LALLS/GPC technique
[d]Weight percent polymer equal to and greater than 4 Mp; separate high ends mode with peak MW greater than 2.5 × $10^6$.

EXAMPLE 10

A series of multifunctional lyophile-containing reagents were prepared by chlorination under radical conditions of a series of commercial and radically polymerized polystyrenes. The polystyrenes were chlorinated in methylene chloride using in situ formed t-butyl hypochlorite as the chlorinating agent. The in situ t-butyl hydrochlorite was formed by bubbling chlorine gas into a methylene chloride solution of the polystyrene containing t-butyl alcohol plus some aqueous NaOH. Under these conditions some benzylic chlorines, which are active under cationic polymerization conditions and serve as sites for attaching butyl chains, are introduced into the polystyrene. The active benzylic chlorines introduced are shown below:

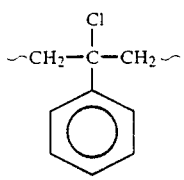

Other less active chlorines are also introduced into the polystyrene block under these conditions so that the branching reagent can be synthesized to contain a higher concentration of chlorine before its use results in a gelled polymer. The multifunctional lyophiles so prepared were used in batch butyl polymerization as in Example 9 to prepare butyl rubbers containing a high ends mode. The amount and molecular weight of the high ends mode was controlled by varying the amount and functionality of the multifunctional lyophile; Table 10-1 below summarizes the experimental results.

TABLE 10-1

| | CPS Branching Agent[a] | | | | | | |
|---|---|---|---|---|---|---|---|
| Run | Cl (b) | Mv (c) | Cl/ Chain (d) | Agent Conc. (e) | Mp (c) | Mz/Mw (f) | High Ends Fraction (g) |
| 1 | 1.99 | 285 | 100 | 0.5 | 300 | 3.0 | 6.1 |
| 2 | 1.99 | 285 | 100 | 1.0 | 150 | 5.0 | 11.5 |
| 3 | 0.37 | 265 | 15 | 1.0 | 300 | 2.4 | 4 |
| 4 | 0.37 | 265 | 15 | 2.0 | 250 | 3.5 | 8 |
| 5 | 10.48 | 221 | 300 | 0.5 | 250 | 3.5 | 6.2 |
| 6 | 10.48 | 221 | 300 | 1.0 | 180 | 6.0 | 12.5 |
| 7 | 0.84 | 468 | 50 | 0.5 | 280 | 3.5 | 7.5 |
| 8 | 0.84 | 468 | 50 | 1.0 | 240 | 6.0 | 14.5 |
| 9 | 6.48 | 79 | 75 | 0.5 | 300 | 3.0 | 6.2 |
| 10 | 6.48 | 79 | 75 | 1.0 | 180 | 5.5 | 12.5 |

[a]Radical Chlorinated Polystyrene
[b]Weight percent
[c]Values shown are $\times 10^{-3}$
[d]Approximate number of chlorine atoms per chain
[e]Weight percent based on monomer
[f]LALLS/GPC technique
[g]Weight percent polymer equal to and greater than 4 Mp; separate high ends mode except for runs 3,4 with broadened distribution. High ends peak MW greater than $2 \times 10^6$; runs 7, 8 greater than $3 \times 10^6$ The use of multifunctional lyophile-containing reagents of the type described in Examples 7–10 to introduce a controlled high ends mode into butyl rubber during polymerization is particularly desirable under continuous polymerization conditions because it introduces the desired high ends mode in a controllable manner without the associated problem of fouling the reactor with insoluble gel which prevents washing the reactor. Additionally, the multifunctional lyophile acts as a slurry stabilizer to prevent reactor fouling and so is a particularly desirable way of introducing the high ends mode.

EXAMPLE 11

Figure 5:
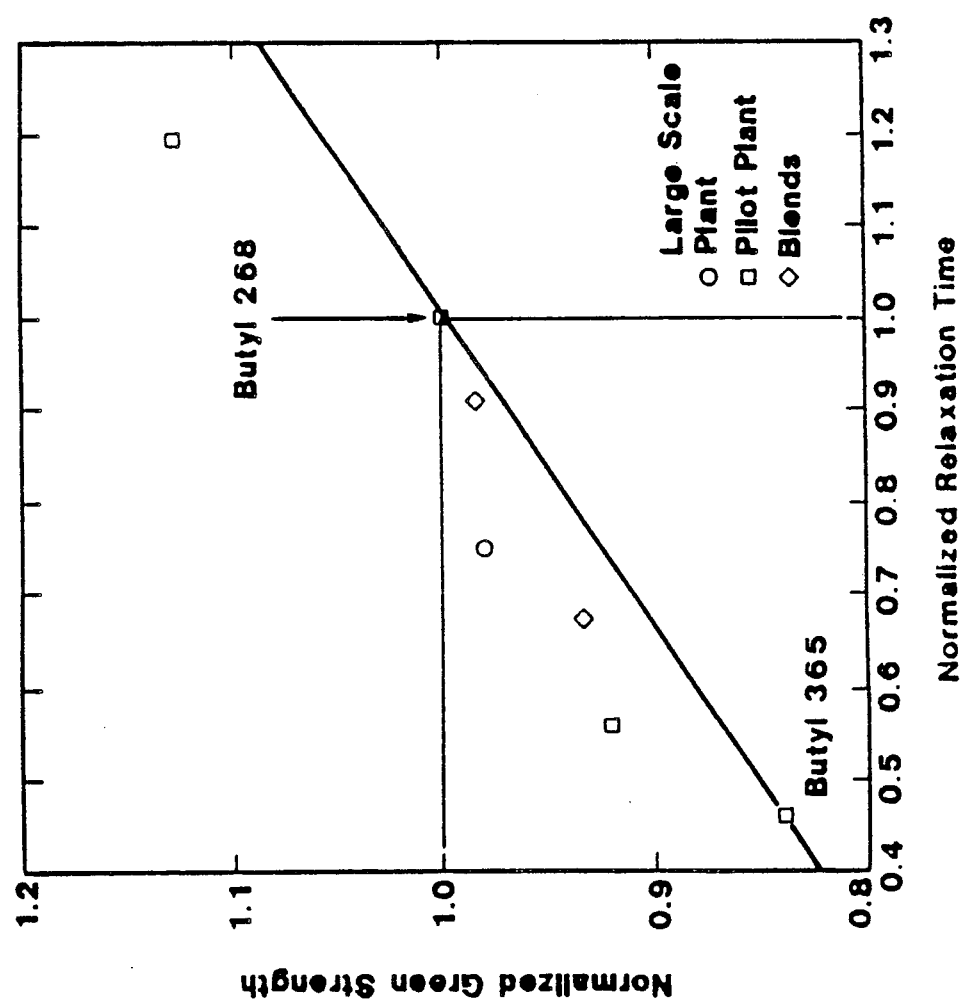

Several polymers of the present invention were tested for green strength using the test method previously described as the stress relaxation processability tester (SRPT). Testing was conducted at 30° C. and measurements were made at 75% relaxation for polymers, 50% for blends. Two groups of polymers and blends were tested, unhalogenated and brominated. For the first group of unhalogenated compositions, comparative polymers included butyl rubber grade 268 and grade 365 as previously described. The data was normalized using the results for Butyl 268 as the reference, with the data for the comparative polymers establishing a reference line (FIG. 5). The blend and directly polymerized polymers had green strength and relaxation time values that generally exceeded this reference line. Several of the samples tested were produced in a large scale polymerization plant and average values representing three samples each are shown. It can be seen that, compared with the reference polymer, the improved composition of this invention has a faster relaxation time at a given green strength and, conversely, a higher green strength for a given relaxation time. Preferably the improved compositions have at least about a 5% improvement, as characterized by stress relaxation, more preferably at least about 10%, most preferably at least about 15%, for example, a 20% improvement. As can be seen from FIGS. 5 and 6 (as discussed below) the rate of change of green strength improvements differs from that of stress relaxation. At constant stress relaxation the preferred improvement in green strength would be approximately one-half of the values just recited, i.e., preferably at least about a 2.5% improvement, etc. The reference polymer, as described in detail in previous examples, is a substantially linear polymer in its molecular configuration and does not contain the desirable high ends fraction which can also be achieved through blending (as, for example, where essentially linear components are used to prepare the blend).

Figure 6:
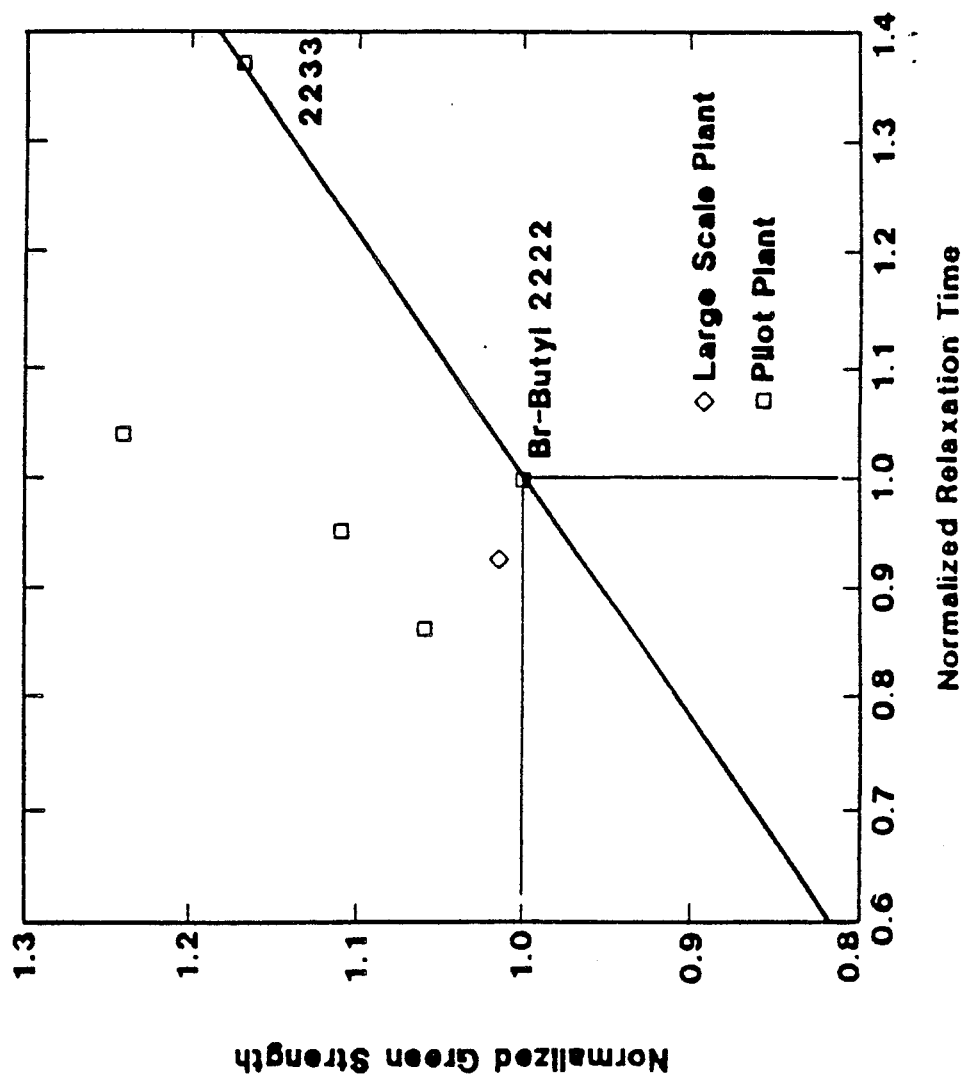

Similar results are obtained where the polymer composition of the present invention is a halogenated polymer, e.g., brominated. Polymers of this type were prepared and compared, as above, using a brominated butyl reference polymer, grade 2222 (Mooney viscosity, 1+8 at 125° C. = 32±5, typical bromine content, 2 wt. %). In addition, another commercial polymer was used for comparative purposes to establish a reference line for substantially linear polymers, brominated butyl grade 2233 (Mooney viscosity, 1+8 at 125° C. = 37±5, typical bromine content, 2 wt. %). The data are shown in FIG. 6; the data point for the large scale plant represents an average of six individual samples.

What is claimed is:

1. A composition of matter comprising a $C_4$–$C_7$ isoolefin homopolymer rubber, butyl copolymer rubber, or mixtures thereof, wherein the molecular weight distribution of said rubber of said mixture is such that the ratio of the moments of said molecular weight distribution, Mz/Mw, is equal to 2.0 to about 11.0 and that portion of said molecular weight distribution which is equal to and greater than 4 times the peak molecular weight, Mp, comprises from about 8 to about 25 weight percent of the total polymer species, Mp is about 250,000 to about 850,000 and wherein said polymer species of molecular weight less than Mp are substantially branch free.

2. The composition of claim 1 wherein said butyl rubber comprises cationically polymerized copolymers of $C_4$–$C_7$ isoolefins and $C_4$–$C_{14}$ conjugated dienes which comprise about 0.5 to about 15 mole percent of said diene and about 85 to about 99.5 mole percent of said isoolefin.

3. The composition of claim 1 wherein said rubber is substantially gel free.

4. The composition of claim 2 further comprising an effective amount of a cationically functional reagent capable of participating in the cationic polymerization reaction producing said rubber, thereby copolymerizing or forming a chemical bond with said rubber.

5. The composition of claim 4 wherein the concentration of functional reagent copolymerized or chemically bonded to said rubber is about 0.3 to about 3.0 weight %.

6. The composition of claim 4 wherein said cationically functional reagent comprises cationically active halogen or cationically active unsaturation.

7. The composition of claim 6 wherein said reagent further comprises a lyophilic, polymerization diluent soluble portion.

8. The composition of claim 6 wherein said cationically active unsaturation comprises a polydiene and partially hydrogenated polydiene selected from the group consisting of polybutadiene, polyisoprene, polypiperylene, natural rubber, styrene-butadiene rubber, ethylene-propylene diene monomer rubber, styrene-butadiene-styrene and styrene-isoprene-styrene block copolymers.

9. The composition of claim 7 wherein said functional reagent is a multifunctional lyophile.

10. The composition of claim 9 wherein said multifunctional lyophile comprises polystyrene comprising cationically active halogen functionality.

11. The composition of claim 10 wherein said multifunctional lyophile comprises a hydrohalogenated styrene-isoprene-styrene triblock polymer.

12. The composition of claim 11 wherein said triblock polymer has a number average molecular weight of about 100,000 to about 300,000, the central polyisoprene block prior to hydrohalogenation comprises about 1 to about 10 weight percent of said triblock polymer and following hydrohalogenation contains about 0.1 to about 1.0 weight percent halogen.

13. The composition of claim 2 wherein said butyl rubber is isobutylene-isoprene rubber.

14. The composition of claim 2 wherein said composition is achieved by blending said homopolymers and/or copolymers of appropriate molecular weight.

15. The composition of claim 14 wherein said blend comprises (A) about 5 to about 25 weight percent of a high molecular weight component, (B) about 0 to about 20 weight percent of a low molecular weight component, and (C) a moderate molecular weight component, wherein the sum of (A)+(B)+(C) equals 100 percent, said molecular weight being viscosity average molecular weight wherein said viscosity average molecular weight of (A) is about 1.5 to about $3.0 \times 10^6$; of (B) is about 1.5 to about $2.5 \times 10^5$; and of (C) is about 3.0 to about $4.0 \times 10^5$.

16. The composition of claim 15 wherein said components are present as follows: (A) about 10 to about 20 weight percent; (B) about 0 to about 15 weight percent; and (C) such that (A)+(B)+(C) equals 100 percent.

17. The composition of claim 16 wherein the viscosity average molecular weight of (A) is about 1.8 to about $2.7 \times 10^6$; (B) is about 1.8 to about $2.2 \times 10^5$; and (C) is about 3.3 to about $3.7 \times 10^5$.

18. The composition of claim 1 wherein Mz/Mw exceeds about 2.2

19. The composition of claim 14, wherein said butyl rubber has a molecular weight, Mz, greater than about $1.2 \times 10^6$ as measured by gel premeation chromatography with a low angle laser light scattering detector.

20. The composition of claim 4, wherein said butyl rubber is isobutylene-isoprene rubber and Mz is greater than about $2.0 \times 10^6$ as measured by gel premeation chromatography with a low angle laser light scattering detector.

21. The composition of claim 1 wherein butyl copolymer rubber is halogenated.

22. The composition of claim 21 wherein said butyl copolymer rubber is isobutylene-isoprene rubber and said halogen is chlorine or bromine.

23. The composition of claim 4 wherein said molecular weight distribution includes a discrete branched high molecular weight mode at a molecular weight greater than 4 Mp.

24. A composition adapted for use in inner tubes comprising butyl copolymer rubber, halogenated butyl copolymer rubber or mixtures thereof wherein the molecular weight distribution of said rubbers or said mixtures is such that the ratio of the moments of said molecular weight distribution, Mz/Mw, is equal to 2.0 to about 11.0 and that portion of said molecular weight distribution which is equal to and greater than 4 times the peak molecular weight, Mp, comprises from about 8 to about 25 weight percent of the total polymer species and Mp is about 250,000 to about 850,000, and wherein said polymer species of molecular weight less than Mp are substantially branch free.

25. A composition adapted for use in tire innerliners comprising butyl copolymer rubber, halogenated butyl copolymer rubber or mixtures thereof wherein the molecular weight distribution of said rubbers or said mixtures is such that the ratio of the moments of said molecular weight distribution, Mz/Mw, is equal to 2.0 to about 11.0 and that portion of said molecular weight distribution which is equal to and greater than 4 times the peak molecular weight, Mp comprises from about 8 to about 25 weight percent of the total polymer species, Mp is greater than about 250,000 to about 850,000, and wherein said polymer species of molecular weight less than Mp are substantially branch free.

26. The composition of claim 25 wherein the halogen is bromine or chlorine.

27. A composition adapted for use in tire sidewalls comprising butyl copolymer rubber, halogenated butyl copolymer rubber or mixtures thereof wherein the molecular weight distribution of said rubbers or said mixtures is such that the ratio of the moments of said molecular weight distribution, Mz/Mw, is equal to 2.0 to about 11.0 and that portion of said molecular weight distribution which is equal to and greater than 4 times the peak molecular weight, Mp, comprises from about 8 to about 25 weight percent of the total polymer species, Mp is greater than about 250,000 to about 850,000, and wherein said polymer species of molecular weight less than Mp are substantially branch free.

* * * * *